(12) United States Patent
Park et al.

(10) Patent No.: US 11,924,842 B2
(45) Date of Patent: Mar. 5, 2024

(54) METHOD AND APPARATUS FOR CONFIGURING DEFAULT BEAM IN WIRELESS COMMUNICATION SYSTEMS

(71) Applicant: Samsung Electronics Co., Ltd., Suwon-si (KR)

(72) Inventors: Jinhyun Park, Suwon-si (KR); Taehyoung Kim, Suwon-si (KR); Hoondong Noh, Suwon-si (KR); Youngrok Jang, Suwon-si (KR); Hyoungju Ji, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/171,298

(22) Filed: Feb. 9, 2021

(65) Prior Publication Data

US 2021/0259001 A1     Aug. 19, 2021

(30) Foreign Application Priority Data

Feb. 13, 2020   (KR) .................. 10-2020-0017923

(51) Int. Cl.
*H04W 72/12* (2009.01)
*H04W 72/04* (2009.01)
(Continued)

(52) U.S. Cl.
CPC ....... *H04W 72/23* (2023.01); *H04W 72/0453* (2013.01); *H04W 72/1273* (2013.01)

(58) Field of Classification Search
CPC ......... H04W 72/1273; H04W 72/0453; H04W 72/042; H04W 72/1289
(Continued)

(56) References Cited

U.S. PATENT DOCUMENTS

2019/0141693 A1\* 5/2019 Guo ................... H04B 7/0695
2019/0342907 A1\* 11/2019 Huang ................. H04W 72/23
(Continued)

OTHER PUBLICATIONS

Ericsson, 'Cross-carrier scheduling with different numerologies', R1-1907331, 3GPP TSG RAN WG1 Meeting #97, Reno, USA, May 4, 2019.
(Continued)

*Primary Examiner* — Peter G Solinsky
(74) *Attorney, Agent, or Firm* — Jefferson IP Law, LLP

(57) ABSTRACT

The disclosure relates to a communication method and system for converging a 5th-Generation (5G) communication system for supporting higher data rates beyond a 4th-Generation (4G) system with a technology for Internet of Things (IoT). The disclosure may be applied to intelligent services based on the 5G communication technology and the IoT-related technology, such as smart home, smart building, smart city, smart car, connected car, health care, digital education, smart retail, security and safety services. A method of a terminal in a wireless communication system is provided. The method includes receiving, from a first cell of a base station, cross carrier scheduling configuration including information indicating that a carrier indicator field (CIF) is included in downlink control information (DCI); receiving, from the first cell of the base station, the DCI for scheduling a physical downlink shared channel (PDSCH), the DCI including the CIF; if the CIF indicates that a resource assignment of the PDSCH is for the first cell, identifying whether a first offset value between a reception of the DCI and the PDSCH is less than a threshold; and in case that the first offset value is less than the threshold and the terminal supports default beam selection for the PDSCH, receiving, from the first cell of the base station, data on the PDSCH based on quasi co-located (QCL) parameters for a control resource set (CORESET) associated with a search (Continued)

space with a lowest CORESET identifier (ID) within an active bandwidth part (BWP) of the first cell in a latest slot monitored by the terminal.

20 Claims, 17 Drawing Sheets

(51) Int. Cl.
   *H04W 72/0453* (2023.01)
   *H04W 72/1273* (2023.01)
   *H04W 72/23* (2023.01)

(58) Field of Classification Search
   USPC .......................................................... 370/329
   See application file for complete search history.

(56) References Cited

U.S. PATENT DOCUMENTS

| | | | |
|---|---|---|---|
| 2020/0029338 A1 | 1/2020 | Lee et al. | |
| 2020/0221485 A1* | 7/2020 | Cirik | H04L 25/0226 |
| 2021/0135830 A1* | 5/2021 | Yu | H04L 5/0092 |
| 2022/0103227 A1* | 3/2022 | Lee | H04W 72/046 |
| 2022/0264537 A1* | 8/2022 | Shi | H04L 5/0044 |

OTHER PUBLICATIONS

Qualcomm Incorporated, 'Crass-Carrier Scheduling with Different Numerologies', R1-1900920, 3GPP TSG RAN WG1 Ad-Hoc Meeting 1901, Taipei, Jan. 12, 2019.
Samsung, 'Remaining Topics on CA and DC', R1-1912499, 3GPP TSG RAN WG1 #99, Reno, USA, Nov. 9, 2019.
International Search Report dated May 25, 2021, issued in Intenational application No. PCT/KR2021/001718.
Vivo, "Remaining issues of cross—carrier scheduling with mix numerologies",3GPP Draft; R1-1906183 Remaining Issues of Cross— Carrier Scheduling With Mix, Numerologies, 3rd Generation Partnership, Project (GPP), Mobile Competence Centre; 650, Route des Lucioles; F-06921 Sophi, vol. RAN WG1, No. Reno, USA; May 13, 2019-May 17, 2019 May 13, 2019 (May 13, 2019), XP051727637.
Extended European Search Report dated Dec. 6, 2022, issued in European Application No. EP 21 75 3880.0.

* cited by examiner

METHOD AND APPARATUS FOR CONFIGURING DEFAULT BEAM IN WIRELESS COMMUNICATION SYSTEMS

CROSS-REFERENCE TO RELATED APPLICATION(S)

This application is based on and claims priority under 35 U.S.C. 119(a) of a Korean patent application number 10-2020-0017923, filed on Feb. 13, 2020, in the Korean Intellectual Property Office, the disclosure of which is incorporated by reference herein in its entirety.

BACKGROUND

1. Field

The disclosure relates to a wireless communication system. More particularly, the disclosure relates to a method and an apparatus for configuring a beam for receiving data in a wireless communication system.

2. Description of Related Art

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology," "wired/wireless communication and network infrastructure," "service interface technology," and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method for determining a default beam that is assumed in the case where beam information for data reception is not indicated to a user equipment in a wireless communication system.

Additional aspects will be set forth in part in the description which follows and, in part, will be apparent from the description, or may be learned by practice of the presented embodiments.

In accordance with an aspect of the disclosure, a method performed by a terminal in a wireless communication system is provided. The method performed by terminal in a wireless communication system includes receiving from a first cell of a base station, cross carrier scheduling configuration including information indicating that a carrier indicator field (CIF) is included in downlink control information (DCI), receiving, from the first cell of the base station, the DCI for scheduling a physical downlink shared channel (PDSCH), the DCI including the CIF, in case that the CIF indicates that a resource assignment of the PDSCH is for the first cell, identifying whether a first offset value between a reception of the DCI and the PDSCH is less than a threshold, in case that the first offset value is less than the threshold and the terminal supports default beam selection for the PDSCH, receiving, from the first cell of the base station, data on the PDSCH based on quasi co-located (QCL) parameters for a control resource set (CORESET) associated with a search space with a lowest CORESET identifier (ID) within an active bandwidth part (BWP) of the first cell in a latest slot monitored by the terminal.

In accordance with another aspect of the disclosure, a method performed by a base station in a wireless communication system is provided. The method performed by a base station in a wireless communication system includes transmitting from a first cell of the base station to a terminal, cross carrier scheduling configuration including information indicating that a CIF is included in DCI, transmitting, from the first cell of the base station to the terminal, the DCI for scheduling a PDSCH, the DCI including the CIF, and in case that the CIF indicates that a resource assignment of the PDSCH is for the first cell, transmitting, from the first cell of the base station to the terminal, first data on the PDSCH, wherein in case that a first offset value between a reception of the DCI and the PDSCH is less than a threshold and the terminal supports default beam selection for the PDSCH, the first data is received based on QCL parameters for a CORESET associated with a search space with a lowest CORESET ID within an active BWP of the first cell in a latest slot monitored by the terminal.

In accordance with another aspect of the disclosure, a terminal in a wireless communication system is provided. The terminal in a wireless communication system includes a transceiver, and a controller coupled with the transceiver and configured to receive, from a first cell of a base station, cross carrier scheduling configuration including information indicating that a CIF is included in DCI, receive, from the first cell of the base station, the DCI for scheduling a PDSCH, the DCI including the CIF, in case that the CIF indicates that a resource assignment of the PDSCH is for the first cell, identify whether a first offset value between a reception of the DCI and the PDSCH is less than a threshold, in case that the first offset value is less than the threshold and the terminal supports default beam selection for the PDSCH, receive, from the first cell of the base station, data on the PDSCH based on QCL parameters for a CORESET associated with a search space with a lowest CORESET ID within an active BWP of the first cell in a latest slot monitored by the terminal.

In accordance with another aspect of the disclosure, a base station in a wireless communication system is provided. The base station in a wireless communication system provides a transceiver, and a controller coupled with the transceiver and configured to transmit, from a first cell of the base station to a terminal, cross carrier scheduling configuration including information indicating that a CIF is included in DCI, transmit, from the first cell of the base station to the terminal, the DCI for scheduling a PDSCH, the DCI including the CIF, and in case that the CIF indicates that a resource assignment of the PDSCH is for the first cell, transmit, from the first cell of the base station to the terminal, first data on the PDSCH, wherein in case that a first offset value between a reception of the DCI and the PDSCH is less than a threshold and the terminal supports default beam selection for the PDSCH, the first data is received based QCL parameters for a CORESET associated with a search space with a lowest CORESET ID within an active BWP of the first cell in a latest slot monitored by the terminal.

According to the disclosure, it is possible to reduce overhead for beam configuration by agreeing to a default value of a beam in advance in order for a user equipment to receive data from a base station in a wireless communication system.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
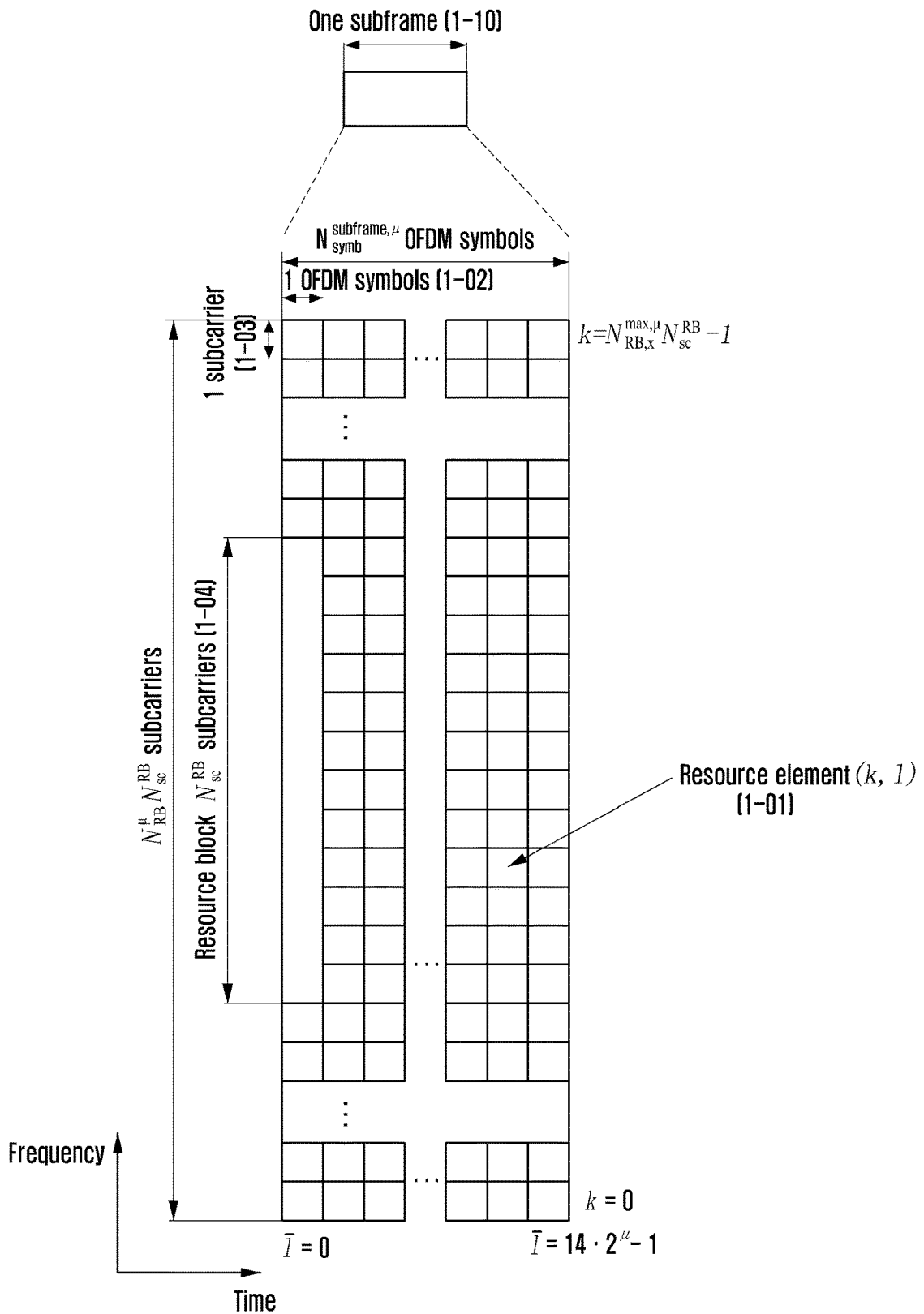
FIG. 1 is a diagram illustrating a time-frequency domain transmission structure of LTE {long-term evolution or evolved universal terrestrial radio access (E-UTRA)}, LTE-Advanced (LTE-A), NR, or a wireless communication system similar thereto according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational operations to be performed on the computer or other programmable apparatus to produce a computer implemented process such that the instructions that execute on the computer or other programmable apparatus provide operations for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit," or divided into a larger number of elements, or a "unit." Moreover, the elements and "units" or may be implemented to reproduce one or more CPUs within a device or a security multimedia card. Further, according to some embodiments, the "unit" may include one or more processors.

Hereinafter, the operation principle of the disclosure will be described in detail in conjunction with the accompanying drawings. In the following description of the disclosure, a detailed description of known functions or configurations incorporated herein will be omitted when it may make the subject matter of the disclosure unnecessarily unclear. The terms which will be described below are terms defined in consideration of the functions in the disclosure, and may be different according to users, intentions of the users, or customs. Therefore, the definitions of the terms should be made based on the contents throughout the specification. In the following description, a base station is an entity that allocates resources to terminals, and may be at least one of a next generation Node B (gNodeB), an evolved Node B (eNodeB or eNB), a Node B, a base station (BS), a wireless access unit, a base station controller, and a node on a network. A terminal may include a user equipment (UE), a mobile station (MS), a cellular phone, a smartphone, a computer, or a multimedia system capable of performing communication functions. Of course, examples of the base station and the terminal are not limited thereto. Hereinafter, a description will be given of a technology for receiving broadcast information from a base station by a terminal in a wireless communication system. The disclosure relates to a communication technique for converging IoT technologies with a $5^{th}$ generation (5G) communication system designed to support a higher data transfer rate beyond the $4^{th}$ generation (4G) system, and a system therefor. The disclosure may be applied to intelligent services (e.g., smart homes, smart buildings, smart cities, smart cars or connected cars, healthcare, digital education, retail business, security and safety-related services, etc.) on the basis of 5G communication technologies and IoT-related technologies.

In the following description, terms referring broadcast information, terms referring to control information, terms related to communication coverage, terms referring to state changes (e.g., event), terms referring to network entities, terms referring to messages, terms referring to device elements, and the like are illustratively used for the sake of convenience. Therefore, the disclosure is not limited by the terms as used below, and other terms referring to subjects having equivalent technical meanings may be used.

In the following description, the disclosure will be described using terms and names defined in the 3rd generation partnership project (3GPP) long term evolution (LTE) standards for the convenience of description. However, the disclosure is not limited by these terms and names, and may be applied in the same way to systems that conform other standards.

A wireless communication system is advancing to a broadband wireless communication system for providing high-speed and high-quality packet data services using communication standards, such as high-speed packet access (HSPA) of 3GPP, LTE {long-term evolution or evolved universal terrestrial radio access (E-UTRA)}, LTE-Advanced (LTE-A), LTE-Pro, high-rate packet data (HRPD) of 3GPP2, ultra-mobile broadband (UMB), IEEE 802.16e, and the like, as well as typical voice-based services.

As a typical example of the broadband wireless communication system, an LTE system employs an orthogonal frequency division multiplexing (OFDM) scheme in a downlink (DL) and employs a single carrier frequency division multiple access (SC-FDMA) scheme in an uplink (UL). The uplink refers to a radio link through which a UE or an MS transmits data or control signals to a BS (e.g., an eNodeB), and the downlink refers to a radio link through which the base station transmits data or control signals to the UE. The above multiple access scheme separates data or control information of respective users by assigning and operating time-frequency resources for transmitting the data or control information for each user so as to avoid overlapping each other, that is, so as to establish orthogonality.

Since a 5G communication system, which is a communication system subsequent to LTE, must freely reflect various requirements of users, service providers, and the like, services satisfying various requirements must be supported. The services considered in the 5G communication system include enhanced mobile broadband (eMBB) communication, massive machine-type communication (mMTC), ultra-reliability low-latency communication (URLLC), and the like.

According to some embodiments, eMBB aims at providing a data rate higher than that supported by existing LTE, LTE-A, or LTE-Pro. For example, in the 5G communication system, eMBB must provide a peak data rate of 20 Gbps in the downlink and a peak data rate of 10 Gbps in the uplink for a single base station. Furthermore, eMBB must provide an increased user-perceived data rate to the UE. In order to satisfy such requirements, transmission/reception technologies including a further enhanced multi-input multi-output (MIMO) transmission technique are required to be improved. In addition, the data rate required for the 5G communication system may be obtained using a frequency bandwidth more than 20 MHz in a frequency band of 3 to 6 GHz or 6 GHz or more, instead of the band of 2 GHz used in the current LTE.

In addition, mMTC is being considered to support application services such as the Internet of Things (IoT) in the 5G communication system. mMTC has requirements, such as support of connection of a large number of UEs in the cell, enhancement of UE coverage, improved battery time, a reduction in the cost of a UE, and the like, in order to effectively provide the Internet of Things. Since the Internet of Things provides communication functions while being provided to various sensors and various devices, it must support a large number of UEs (e.g., 1,000,000 UEs/km²) in the cell. In addition, the UEs supporting mMTC may require wider coverage than those of other services provided by the 5G communication system because the UEs are likely to be located in a shadow area, such as a basement of a building, which is not covered by the cell due to the nature of the service. The UE supporting mMTC must be configured to be inexpensive, and may require a very long battery life-time because it is difficult to frequently replace the battery of the UE.

Lastly, URLLC, which is a cellular-based mission-critical wireless communication service, is used for remote control for robots or machines, industrial automation, unmanned aerial vehicles, remote health care, emergency alert, and the like, and must provide communication with ultra-low latency and ultra-high reliability. For example, a service supporting URLLC must satisfy an air interface latency of less than 0.5 ms, and also requires a packet error rate of 10 to 5 or less. Therefore, for the services supporting URLLC, the 5G system must provide a transmit time interval (TTI) shorter than those of other services, and also requires a design for assigning a large amount of resources in the frequency band. However, the above-mentioned mMTC, URLLC, and eMBB are only examples of different types of services, and the disclosure is not limited to the types of services described above.

The above-mentioned services considered in the 5G communication system must converge to a single framework to then be provided. That is, the respective services are preferably integrated into a single system to then be controlled and transmitted, instead of operating the services independently, for efficient resource management and control.

In addition, although the embodiments will be described below by way of example as LTE, LTE-A, LTE-Pro, or NR systems, the embodiments are able to be applied to other communication systems having similar technical backgrounds or channel forms. Further, the embodiments are able to be applied to other communication systems through some modifications thereof without departing from the scope of the disclosure according to judgment by those skilled in the art.

Hereinafter, a frame structure of the 5G system will be described in more detail with reference to the drawings.

FIG. 1 is a diagram illustrating a fundamental structure of time-frequency resources in a wireless communication system according to an embodiment of the disclosure.

Referring to FIG. 1, the horizontal axis represents a time domain, and the vertical axis represents a frequency domain in FIG. 1. The basic unit of a resource in the time-frequency domain is a resource element (RE) 1-01, which may be defined as one orthogonal frequency division multiplexing (OFDM) symbol 1-02 on the time domain and one subcarrier 1-03 on the frequency domain. Consecutive $N_{sc}^{RB}$ (e.g., 12) REs may constitute one resource block (RB) 1-04 in the frequency domain. In an embodiment, a plurality of OFDM symbols may constitute one subframe 1-10.

Figure 2:
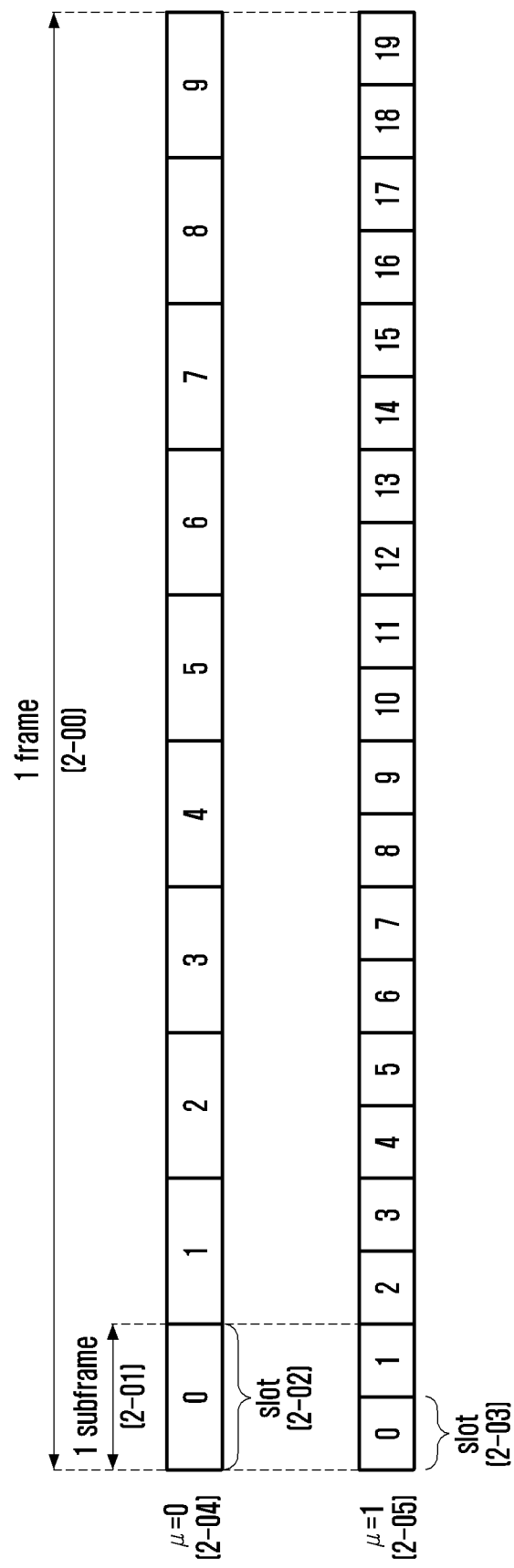
FIG. 2 is a diagram illustrating structures of a frame, a subframe, and a slot in $5^{th}$ generation (5G) according to an embodiment of the disclosure.

FIG. 2 is a diagram illustrating structures of a frame, a subframe, and a slot according to an embodiment of the disclosure.

Referring to FIG. 2, one frame 2-00 may include one or more subframes 2-01, and one subframe 2-01 may include one or more slots 2-02. For example, one frame 2-00 may be defined as 10 ms. One subframe 2-01 may be defined as 1 ms, and in this case, one frame 2-00 may include a total of 10 subframes 2-01. One slot 2-02 or 2-03 may be defined as 14 OFDM symbols {that is, the number of symbols per slot ($N_{symb}^{slot}$)=14}. One subframe 2-01 may include one or more slots 2-02 and 2-03, and the number of slots 2-02 and 2-03 for each subframe 2-01 may vary depending on a configuration value μ of subcarrier spacing 2-04 or 2-05. The example in FIG. 2 shows the case of μ=0 (2-04) and the case of μ=1 (2-05) as a configuration value of subcarrier spacing. In the case of μ=0 (2-04), one subframe 2-01 may include one slot 2-02, and in the case of μ=1 (2-05), one subframe 2-01 may include two slots 2-03. That is, the number of slots for each subframe ($N_{slot}^{subframe,\mu}$) may vary depending on the configuration value μ of subcarrier spacing, and the number of slots for each frame ($N_{slot}^{frame,\mu}$) may vary according thereto. $N_{slot}^{subframe,\mu}$ and $N_{slot}^{frame,\mu}$ depending on each configuration value μ of subcarrier spacing may be defined as shown in Table 1 below.

TABLE 1

| $\mu$ | $N_{symb}^{slot}$ | $N_{slot}^{frame, \mu}$ | $N_{slot}^{subframe, \mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

In NR, one component carrier (CC) or serving cell may include up to 250 RBs. Therefore, in the case where a UE always receives the overall serving cell bandwidth, such as LTE, power consumption by the UE may be severe, and in order to solve this problem, the base station may configure one or more bandwidth parts (BWPs) for the UE such that the UE is able to change a reception area in the cell. In NR, the base station may configure an "initial BWP," which is the bandwidth of CORESET #0 {or common search space (CSS)}, for the UE through a master information block (MIB). Thereafter, the base station may configure an initial BWP (first BWP) of the UE through RRC signaling, and may transmit a notification of one or more pieces of BWP configuration information that may be indicated through downlink control information (DCI) later. Afterwards, the base station may transmit a notification of a BWP ID through DCI, thereby indicating the band to be used by the UE. If the UE fails to receive DCI in the currently assigned BWP for a specific period of time or more, the UE returns to a "default BWP" and attempts to receive DCI.

Figure 3:
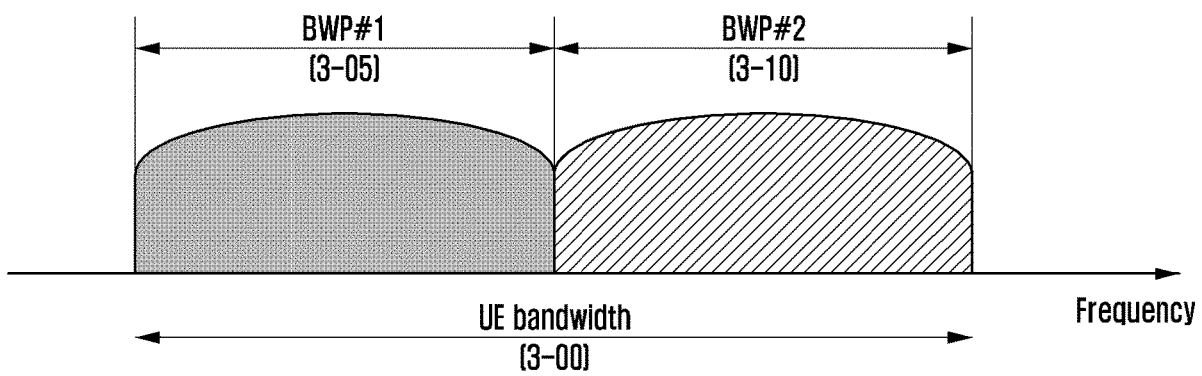
FIG. 3 illustrates an example of a configuration of a bandwidth part (BWP) in a wireless communication system according to an embodiment of the disclosure.

FIG. 3 is a diagram illustrating an example of the configuration of a bandwidth part (BWP) in a wireless communication system according to an embodiment of the disclosure.

Referring to FIG. 3, FIG. 3 illustrates an example in which a UE bandwidth 3-00 is configured to have two bandwidth parts, that is, bandwidth part #1 (3-05) and bandwidth part #2 (3-10). The base station may configure one or more bandwidth parts for the UE, and may configure information on each bandwidth part as shown in Table 2 below.

TABLE 2

```
BWP ::=              SEQUENCE {
    bwp-ID               BWP-Id,
    locationAndBandwidth       INTEGER (1..65536),
    subcarrierSpacing          ENUMERATED
                                {n0, n1, n2, n3, n4, n5 }
    cyclicPrefix          ENUMERATED { extended }
}
```

In addition to the configuration information described in Table 2, various parameters related to the bandwidth part may be configured for the UE. The base station may transmit the above information to the UE through higher layer signaling, for example, RRC signaling. At least one of the one or more configured bandwidth parts may be activated. Information on whether or not to activate the configured bandwidth part may be transmitted from the base station to the UE semi-statically through RRC signaling or dynamically through a MAC control element (CE) or DCI.

According to an embodiment, an initial bandwidth part (BWP) for initial access may be configured for the UE prior to a radio resource control (RRC) connection by the base station through a master information block (MIB). More specifically, the UE may receive configuration information on a control resource set (CORESET) through which a PDCCH is able to be transmitted and a search space in order to receive system information {that may correspond to remaining system information (RMSI) or system information block 1 (SIB1)} required for initial access through the MIB in the initial access stage. The control resource set and the search space configured using an MIB may be regarded as an identity (ID) "0," respectively.

The base station may notify the UE of configuration information, such as frequency assignment information, time assignment information, numerology, and the like, for control resource set #0 through an MIB. In addition, the base station may notify the UE of configuration information on monitoring periodicity and an occasion for control resource set #0 (i.e., configuration information on search space #0) through an MIB. The UE may regard the frequency domain configured with control resource set #0 obtained from the MIB as an initial bandwidth part for initial access. In this case, the identity (ID) of the initial bandwidth part may be regarded as 0.

Configuration of the bandwidth part supported by the next-generation mobile communication system (the 5G or NR system) may be used for various purposes.

For example, in the case where the bandwidth supported by the UE is smaller than the system bandwidth, the bandwidth supported by the UE may be supported by configuration of the bandwidth part. For example, a frequency location of the bandwidth part (configuration information 2) may be configured for the UE in Table 2 so that the UE may transmit and receive data at a specific frequency location within the system bandwidth.

As another example, the base station may configure a plurality of bandwidth parts with respect to the UE for the purpose of supporting different numerologies. For example, in order to support transmission and reception of data using a subcarrier spacing of 15 kHz and a subcarrier spacing of 30 kHz for any UE, two bandwidth parts may be configured to use a subcarrier spacing of 15 kHz and a subcarrier spacing of 30 kHz, respectively. Frequency division multiplexing may be performed on different bandwidth parts, and in the case of transmitting and receiving data with a specific subcarrier spacing, a bandwidth part configured with the corresponding subcarrier spacing may be activated.

As another example, the base station may configure bandwidth parts having different bandwidths with respect to the UE for the purpose of reducing power consumption of the UE. For example, if the UE supports a very large bandwidth (e.g., a 100 MHz bandwidth) and always transmits and receives data through the corresponding bandwidth, very high power consumption may be caused. In particular, it is very inefficient in terms of power consumption for the UE to monitor unnecessary downlink control channels with respect to a large bandwidth of 100 MHz in the absence of traffic. Therefore, the base station may configure a bandwidth part having a relatively small bandwidth (e.g., a 20 MHz bandwidth part) for the UE for the purpose of reducing power consumption by the UE. In the absence of traffic, the UE may perform a monitoring operation in a 20 MHz bandwidth part, and, if data is produced, the UE may transmit and receive data using a 100 MHz bandwidth part according to the indication of the base station.

In a method of configuring the bandwidth part, the UEs that have not yet been RRC-connected may receive configuration information about an initial bandwidth part through a master information block (MIB) in the initial access stage. More specifically, the UE may receive, from the MIB of a physical broadcast channel (PBCH), a configuration of a control resource set (CORESET) for a downlink control channel through which downlink control information (DCI) for scheduling a system information block (SIB) is able to be transmitted. The bandwidth of the control resource set configured through the MIB may be regarded as an initial bandwidth part, and the UE may receive a PDSCH through which an SIB is transmitted through the configured initial bandwidth part. The initial bandwidth part may be used for other system information (OSI), paging, and random access, as well as the reception of an SIB.

Hereinafter, a synchronization signal (SS)/PBCH block (SSB) of a next-generation mobile communication system (the 5G or NR system) will be described.

The SS/PBCH block may indicate a physical layer channel block including a primary SS (PSS), a secondary SS (SSS), and a PBCH. More specifically, the SS/PBCH block may be defined as follows.

PSS: This is a reference signal for downlink time/frequency synchronization, and may provide some information of a cell ID.

SSS: This is a reference for downlink time/frequency synchronization, and may provide the remaining information of the cell ID, which is not provided by the PSS. Additionally, this may serve as a reference signal for demodulation of a PBCH.

PBCH: This may provide essential system information necessary for transmission and reception of a data channel and a control channel of the UE. The essential system information may include search space-related control information indicating radio resource mapping information of the control channel, scheduling control information for a separate data channel transmitting system information, and the like.

SS/PBCH block: The SS/PBCH block may be configured as a combination of the PSS, the SSS, and the PBCH. One or more SS/PBCH blocks may be transmitted within a time period of 5 ms, and each transmitted SS/PBCH block may be distinguished by an index.

The UE may detect the PSS and the SSS in the initial access stage, and may decode the PBCH. The UE may acquire an MIB from the PBCH, and may receive a configuration of control resource set #0 through the MIB. The UE may assume that a selected SS/PBCH block and a demodulation reference signal (DMRS) transmitted in control resource set #0 have a relationship of quasi co-location (QCL), thereby monitoring control resource set #0. The UE may receive system information through downlink control information transmitted from control resource set #0. The UE may obtain configuration information related to a random access channel (RACH), which is necessary for initial access, from the received system information. The UE may transmit a physical RACH (PRACH) to the base station in consideration of the selected SS/PBCH index, and the base station receiving the PRACH may obtain information on the SS/PBCH block index selected by the UE. The base station may recognize which block has been selected by the UE from among the respective SS/PBCH blocks and monitoring of control resource set #0 corresponding to (or associated with) the SS/PBCH block selected by the UE.

Hereinafter, downlink control information (hereinafter referred to as "DCI") in a next-generation mobile communication system (the 5G or NR system) will be described in detail.

In the next-generation mobile communication system (the 5G or NR system), scheduling information on uplink data {or a physical uplink shared channel (PUSCH)} or downlink data {or a physical downlink data channel (PDSCH)} may be transmitted from the base station to the UE through DCI. The UE may monitor a DCI format for fallback and a DCI format for non-fallback with respect to a PUSCH or PDSCH. The DCI format for fallback may be configured as a fixed field that is predefined between the base station and the UE, and the DCI format for non-fallback may include a configurable field.

The DCI may be transmitted through a physical downlink control channel (PDCCH) after a channel coding and modulation process. A cyclic redundancy check (CRC) may be attached to the payload of a DCI message, and the CRC may be scrambled with a radio network temporary identifier (RNTI) corresponding to the identity of the UE. Different RNTIs may be used for scrambling the CRC attached to the payload of the DCI message according to the purpose of the DCI message, for example, transmission of UE-specific data, power control command, random access response, or the like. That is, the RNTI may be included in the CRC calculation process, and may then be transmitted, instead of being explicitly transmitted. If the DCI message transmitted through the PDCCH is received, the UE may check the CRC using the assigned RNTI. If the CRC check result is correct, the UE may recognize that the message is intended for the UE.

For example, the DCI for scheduling a PDSCH for system information (SI) may be scrambled with an SI-RNTI. The DCI for scheduling a PDSCH for a random access response (RAR) message may be scrambled with an RA-RNTI. The DCI for scheduling a PDSCH for a paging message may be scrambled with a P-RNTI. The DCI for transmitting a notification of a slot format indicator (SFI) may be scrambled with an SFI-RNTI. DCI for transmitting a notification of transmit power control (TPC) may be scrambled with a TPC-RNTI. The DCI for scheduling UE-specific PDSCH or PUSCH may be scrambled with a cell-RNTI (C-RNTI).

DCI format 0_0 may be used as fallback DCI for scheduling a PUSCH, and in this case, the CRC may be scrambled with a C-RNTI. In an embodiment, DCI format 0_0 in which the CRC is scrambled with a C-RNTI may include information as shown in Table 3 below.

TABLE 3

Identifier for DCI formats - [1] bit
Frequency domain resource assignment - [[log$_2$(N$_{RB}^{UL, BWP}$(N$_{RB}^{UL, BWP}$ + 1)/2)]] bits
Time domain resource assignment - X bits
Frequency hopping flag - 1 bit
Modulation and coding scheme - 5 bits
New data indicator - 1 bit
Redundancy version - 2 bits
HARQ process number - 4 bits
TPC command for scheduled PUSCH - [2] bits
UL/SUL indicator - 0 or 1 bit DCI format 0_1 may be used as non-fallback DCI for scheduling a PUSCH, and in this case, the CRC may be scrambled with a C-RNTI. In an embodiment, DCI format 0_1 in which the CRC is scrambled with a C-RNTI may include information as shown in Table 4 below.

TABLE 4

Carrier indicator – 0 or 3 bits
UL/SUL indicator – 0 or 1 bit
Identifier for DCI formats – [1] bits
Bandwidth part indicator – 0, 1, or 2 bits TABLE 4-continued Frequency domain resource assignment
    For resource allocation type 0, $\lceil N_{RB}^{UL,BWP}/P \rceil$ bits
    For resource allocation type 1, $\lceil \log_2(N_{RB}^{UL,BWP}(N_{RB}^{UL,BWP}+1)/2\rceil$ bits
Time domain resource assignment – 1, 2, 3, or 4 bits
VRB-to-PRB mapping – 0 or 1 bit, only for resource allocation type 1.
    0 bit if only resource allocation type 0 is configured;
    1 bit otherwise.
Frequency hopping flag – 0 or 1 bit, only for resource allocation type 1.
    0 bit if only resource allocation type 0 is configured;
    1 bit otherwise.
Modulation and coding scheme – 5 bits
New data indicator – 1 bit
Redundancy version – 2 bits
HARQ process number – 4 bits
1st downlink assignment index – 1 or 2 bits
    1 bit for semi-static HARQ-ACK codebook;
    2 bit for dynamic HARQ-ACK codebook with single HARQ-ACK codebook.
2nd downlink assignment index – 0 or 2 bits
    2 bits for dynamic HARQ-ACK codebook with two HARQ-ACK sub-codebooks;
    0 bit otherwise.
TPC command for scheduled PUSCH – 2 bits
SRS resource indicator – $\left\lceil \log_2\left(\sum_{k=1}^{L_{max}} \binom{N_{SRS}}{k}\right)\right\rceil$ or $\lceil \log_2(N_{SRS})\rceil$ bits $\left\lceil \log_2\left(\sum_{k=1}^{L_{max}} \binom{N_{SRS}}{k}\right)\right\rceil$ bits for non-codebook based PUSCH transmission $\lceil \log_2(N_{SRS})\rceil$ bits for codebook based PUSCH transmission
Precoding information and number of layers – up to 6 bits
Antenna ports – up to 5 bits
SRS request – 2 bits
CSI request – 0, 1, 2, 3, 4, 5, or 6 bits
CBG transmission information – 0 2, 4, 6, or 8 bits
PTRS-DMRS association – 0 or 2 bits
beta_offset indicator – 0 or 2 bits
DMRS sequence initialization – 0 or 1 bit DCI format 1_0 may be used as fallback DCI for scheduling a PDSCH, and in this case, the CRC may be scrambled with a C-RNTI. In an embodiment, DCI format 1_0 in which the CRC is scrambled with a C-RNTI may include information as shown in Table 5 below.

TABLE 5

Identifier for DCI formats - [1] bit
Frequency domain resource assignment - $[\lceil \log_2(N_{RB}^{DL,BWP}(N_{RB}^{DL,BWP}+1)/2)\rceil]$ bits
Time domain resource assignment - X bits
VRB-to-PRB mapping - 1 bit.
Modulation and coding scheme - 5 bits
New data indicator - 1 bit
Redundancy version - 2 bits
HARQ process number - 4 bits
Downlink assignment index - 2 bits
TPC command for scheduled PUCCH - [2] bits
PUCCH resource indicator - 3 bits
PDSCH-to-HARQ feedback timing indicator - [3] bits Alternatively, DCI format 1_0 may be used as DCI for scheduling a PDSCH for an RAR message, and in this case, the CRC may be scrambled with an RA-RNTI. DCI format 1_0 in which the CRC is scrambled with an RA-RNTI may include information as shown in Table 6 below.

TABLE 6

Frequency domain resource assignment -$\lceil \log_2(N_{RB}^{DL,BWP}(N_{RB}^{DL,BWP}+1)/2)\rceil$ bits
Time domain resource assignment - 4 bits
VRB-to-PRB mapping - 1 bit
Modulation and coding scheme - 5 bits
TB scaling - 2 bits
Reserved bits - 16 bits DCI format 1_1 may be used as non-fallback DCI for scheduling a PDSCH, and in this case, the CRC may be scrambled with a C-RNTI. In an embodiment, DCI format 1_1 in which the CRC is scrambled with a C-RNTI may include information as shown in Table 7 below.

TABLE 7

Figure 4:
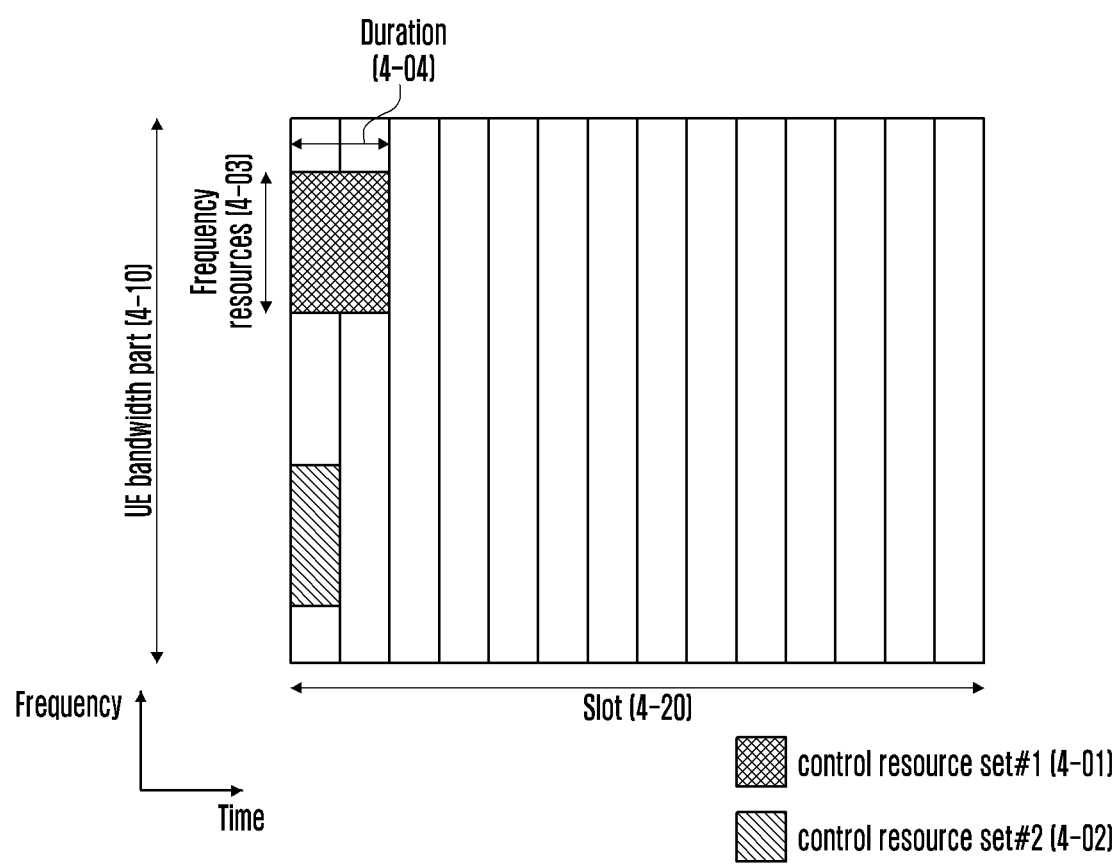
FIG. 4 is a diagram illustrating an example of configuring control resource sets of a downlink control channel in a wireless communication system according to an embodiment of the disclosure.

Carrier indicator - 0 or 3 bits
Identifier for DCI formats - [1] bits
Bandwidth part indicator - 0, 1 or 2 bits
Frequency domain resource assignment
    For resource allocation type 0, $\lceil N_{RB}^{DL,BWP}/P \rceil$ bits
    For resource allocation type 1,
    $\lceil \log_2(N_{RB}^{DL,BWP}(N_{RB}^{DL,BWP}+1)/2)\rceil$ bits
Time domain resource assignment - 0, 1, 2, 3, or 4 bits
VRB-to-PRB mapping - 0 or 1 bit:
    0 bit if only resource allocation type 0 is configured;
    1 bit otherwise
PRB bundling size indicator - 0 or 1 bit
Rate matching indicator - 0, 1, or 2 bits
ZP CSI-RS trigger - 0, 1, or 2 bits
For transport block 1:
    Modulation and coding scheme - 5 bits
    New data indicator - 1 bit
    Redundancy version - 2 bits
For transport block 2:
    Modulation and coding scheme - 5 bits
    New data indicator - 1 bit
    Redundancy version - 2 bits
HARQ process number - 4 bits
Downlink assignment index - 0 or 2 or 4 bits
TPC command for scheduled PUCCH - 2 bits
PUCCH resource indicator - 3 bits
PDSCH-to-HARQ_feedback timing indicator - 3 bits
Antenna ports - 4, 5 or 6 bits
Transmission configuration indication (TCI) - 0 or 3 bits
SRS request - 2 bits
CBG transmission information - 0, 2, 4, 6, or 8 bits
CBG flushing out information - 0 or 1 bit
DMRS sequence initialization - 1 bit FIG. 4 is a diagram illustrating an example of configuring control resource sets of a downlink control channel in a wireless communication system according to an embodiment of the disclosure. FIG. 4 is a diagram illustrating an embodiment of a control resource set (CORESET) in which a downlink control channel is transmitted in a 5G wireless communication system according to an embodiment.

Referring to FIG. 4, FIG. 4 illustrates an embodiment in which two control resource sets (i.e., control resource set #1 (4-01) and control resource set #2 (4-02)) are configured within a UE bandwidth part 4-10 in the frequency domain and one slot 4-20 in the time domain. The control resource set 4-01 or 4-02 may be configured in a specific frequency resource 4-03 within the entire UE bandwidth part 4-10 in the frequency domain. The control resource set 4-01 or 4-02 may be configured using one or more OFDM symbols in the time domain, and this may be defined as control resource set duration 4-04. Referring to FIG. 4, control resource set #1 (4-01) may be configured to have a control resource set duration of two symbols, and control resource set #2 (4-02) may be configured to have a control resource set duration of one symbol.

The above-described control resource sets in the next-generation mobile communication system (the 5G or NR system) may be configured through higher layer signaling {e.g., system information, a master information block (MIB), and radio resource control (RRC) signaling} transmitted from the base station to the UE. Configuring the control resource set for the UE denotes providing the UE with information such as a control resource set identity, the frequency location of the control resource set, the symbol duration of the control resource set, and the like. For example, the configuration of the control resource set may include information shown in Table 8 below.

TABLE 8

```
ControlResourceSet ::=            SEQUENCE {
  controlResourceSetId              ControlResourceSetId,
  frequencyDomainResources            BIT STRING (SIZE (45)),
  duration                    INTEGER (1..maxCoReSetDuration),
  cce-REG-MappingType               CHOICE {
    interleaved                 SEQUENCE {
      reg-BundleSize              ENUMERATED {n2, n3, n6},
         precoderGranularity               ENUMERATED {sameAsREG-bundle,
allContiguousRBs},
      interleaverSize             ENUMERATED {n2, n3, n6},
      shiftIndex          INTEGER (0..maxNrofPhysicalResourceBlocks−1)
    },
    nonInterleaved              NULL
  },
    tci-StatesPDCCH                       SEQUENCE (SIZE (1..maxNrofTCI-
StatesPDCCH)) OF TCI-StateId            OPTIONAL,
    tci-PresentInDCI             ENUMERATED {enabled}
}
```

In Table 8, "tci-StatesPDCCH" (hereinafter referred to as "TCI state") configuration information may include information on one or more synchronization signal (SS)/physical broadcast channel (PBCH) block indexes or channel state information reference signal (CSI-RS) indexes having a quasi co-located (QCL) relationship with a demodulation reference signal (DMRS) transmitted in the corresponding control resource set.

One or more different antenna ports (these may be replaced with one or more channels, signals, and a combination thereof, but will be collectively referred to as "different antenna ports" in the description of the disclosure below for convenience) may be associated with each other by the QCL configuration as shown in Table 9 below in the wireless communication system.

TABLE 9

```
QCL-Info ::=      SEQUENCE {
  cell           ServCellIndex (Index of serving cell in which QCL reference RS
is transmitted)
  bwp-Id         BWP-Id (Index of bandwidth part in which QCL reference RS is
transmitted)
  referenceSignal          CHOICE (Indicator indicating one of CSI0RS or SS/PBCH
block using QCL reference RS)
    csi-rs        NZP-CSI-RS-ResourceId,
    ssb         SSB-Index
},
  qcl-Type         ENUMERATED {typeA, typeB, typeC, type D}, (QCL type
indicator)
...
}
```

Specifically, QCL configuration may connect two different antenna ports as a relationship of a (QCL) target antenna port and a (QCL) reference antenna port, and the UE may apply (or assume) all or some of the statistical characteristics of the channel measured at the reference antenna port {e.g., large scale parameters of the channel, such as Doppler shift, Doppler spread, average delay, delay spread, average gain, spatial Rx (or Tx) parameters, and the like, or a reception spatial filter coefficient or transmission spatial filter coefficient of the UE} in reception through the target antenna port. The target antenna port indicates an antenna port for transmitting the channel or the signal configured through higher layer configuration including the QCL configuration, or an antenna port for transmitting the channel or the signal to which a TCI state indicating the QCL configuration is applied. The reference antenna port indicates an antenna port for transmitting the channel or the signal indicated (specified) by the parameter "referenceSignal" in the QCL configuration.

Specifically, the statistical characteristics of the channel defined by the QCL configuration (indicated by the parameter "qcl-Type" in the QCL configuration) may be classified as follows according to the QCL type.

* "QCL-TypeA": {Doppler shift, Doppler spread, average delay, delay spread}
* "QCL-TypeB": {Doppler shift, Doppler spread}
* "QCL-TypeC": {Doppler shift, average delay}
* "QCL-TypeD": {Spatial Rx parameter}

Although the QCL types are not limited to the four types described above, all possible combinations will not be provided so as to not obscure the subject matter of description. QCL-TypeA is a QCL type used in the case where the bandwidth and the transmission interval of the target antenna port are sufficient compared to the reference antenna port (i.e., in the case where the number of samples and the transmission band/time of the target antenna port are greater than the number of samples and the transmission band/time of the reference antenna port both in the frequency domain and in the time domain) so that all statistical characteristics, which are measurable in the frequency and time domains, are referenceable. QCL-TypeB is a QCL type used in the case where the bandwidth of the target antenna port is sufficient to measure the statistical characteristics, which are measurable in the frequency domain, that is, Doppler shift and Doppler spread. QCL-TypeC is a QCL type used in the case where only the first-order statistics, that is, Doppler shift and average delay, are referenceable because the bandwidth and the transmission interval of the target antenna port are insufficient to measure the second-order statistics, that is, Doppler spread and delay spread. QCL-TypeD is a QCL type configured in the case where spatial reception filter values used when receiving the reference antenna port are able to be used when receiving the target antenna port.

Meanwhile, the base station is able to configure or indicate up to two QCL configurations with respect to one target antenna port through TCI state configuration as shown in Table 10 below.

TABLE 10

```
TCI-State ::=       SEQUENCE {
    tci-StateId     TCI-StateID,
    qcl-Type1       QCL-Info, (Configuration of first QCL for target antenna port to
which corresponding TCI state is applied)
    qcl-Type2       QCL-Info (Configuration of second QCL for target antenna port
to which corresponding TCI state is applied) OPTIONAL, --Need R
    ...
}
```

The first QCL configuration among the two QCL configurations included in one TCI state configuration may be configured as one of QCL-TypeA, QCL-TypeB, and QCL-TypeC. In this case, the configurable QCL type is specified depending on the types of the target antenna port and the reference antenna port, and will be described in detail below. In addition, the second QCL configuration among the two QCL configurations included in the one TCI state configuration may be configured as QCL-TypeD, and may be omitted in some cases.

Tables 11 to 15 show effective TCI state configurations depending on the type of target antenna port.

Table 11 shows an effective TCI state configuration in the case where the target antenna port is an CSI-RS for tracking (TRS). The TRS includes an NZP CSI-RS in which a repetition parameter is not configured and in which "trs-Info" is configured to be true, among the CSI-RSs. Configuration 3 in Table 9BA may be used for aperiodic TRS.

TABLE 11

Effective TCI state configurations when target antenna port is CSI-RS for tracking (TRS)

| Valid TCI state Configuration | DL RS1 | qcl-Type1 | DL RS2 (if configured) | qcl-Type2 (if configured) |
|---|---|---|---|---|
| 1 | SSB | QCL-TypeC | SSB | QCL-TypeD |
| 2 | SSB | QCL-TypeC | CSI-RS (BM) | QCL-TypeD |
| 3 | TRS (periodic) | QCL-TypeA | TRS (same as DL RS1) | QCL-TypeD |

Table 12 indicates TCI state configurations in the case where the target antenna port is a CSI-RS for CSI. The CSI-RS for CSI indicates an NZP CSI-RS, among the CSI-RSs, in which a repetition parameter is not configured and in which "trs-Info" is not configured to be true.

TABLE 12

Effective TCI state configurations when target antenna port is CSI-RS for CSI

| Valid TCI state Configuration | DL RS1 | qcl-Type1 | DL RS2 (if configured) | qcl-Type2 (if configured) |
|---|---|---|---|---|
| 1 | TRS | QCL-TypeA | SSB | QCL-TypeD |
| 2 | TRS | QCL-TypeA | CSI-RS (BM) | QCL-TypeD |
| 3 | TRS | QCL-TypeA | TRS (same as DL RS1) | QCL-TypeD |
| 4 | TRS | QCL-TypeB | | |

Table 13 indicates TCI state configurations in the case where the target antenna port is a CSI-RS for beam management (BM) (the same meaning as a CSI-RS for L1 RSRP reporting). The CSI-RS for BM indicates an NZP CSI-RS, among the CSI-RSs, in which a repetition parameter is configured to have a value of On or Off and in which "trs-Info" is not configured to be true.

TABLE 13

Effective TCI state configurations when target antenna port is CSI-RS for BM (for L1 RSRP reporting)

| Valid TCI state Configuration | DL RS1 | qcl-Type1 | DL RS2 (if configured) | qcl-Type2 (if configured) |
|---|---|---|---|---|
| 1 | TRS | QCL-TypeA | TRS (same as DL RS1) | QCL-TypeD |
| 2 | TRS | QCL-TypeA | CSI-RS (BM) | QCL-TypeD |
| 3 | SS/PBCH Block | QCL-TypeC | SS/PBCH Block | QCL-TypeD |

Table 14 indicates TCI state configurations in the case where the target antenna port is a PDCCH DMRS.

TABLE 14

Effective TCI state configurations when target antenna port is PDCCH DMRS

| Valid TCI state Configuration | DL RS1 | qcl-Type1 | DL RS2 (if configured) | qcl-Type2 (if configured) |
|---|---|---|---|---|
| 1 | TRS | QCL-TypeA | TRS (same as DL RS1) | QCL-TypeD |
| 2 | TRS | QCL-TypeA | CSI-RS (BM) | QCL-TypeD |
| 3 | CSI-RS (CSI) | QCL-TypeA | CSI-RS (same as DL RS1) | QCL-TypeD |

Table 15 indicates TCI state configurations in the case where the target antenna port is a PDSCH DMRS.

TABLE 15

Effective TCI state configurations when target antenna port is PDSCH DMRS

| Valid TCI state Configuration | DL RS1 | qcl-Type1 | DL RS2 (if configured) | qcl-Type2 (if configured) |
|---|---|---|---|---|
| 1 | TRS | QCL-TypeA | TRS | QCL-TypeD |
| 2 | TRS | QCL-TypeA | CSI-RS (BM) | QCL-TypeD |
| 3 | CSI-RS (CSI) | QCL-TypeA | CSI-RS (CSI) | QCL-TypeD |

A typical QCL configuration method by Tables 9BA to 9BE is configuring the target antenna port and reference antenna port for respective operations as "SSB"→"TRS"→"CSI-RS for CSI, CSI-RS for BM, PDCCH DMRS, or PDSCH DMRS" and operating the same. Through this, the statistical characteristics, which are measurable from the SSB and the TRS, may be associated with the respective antenna ports, thereby assisting the UE with the reception operation.

Figure 5:
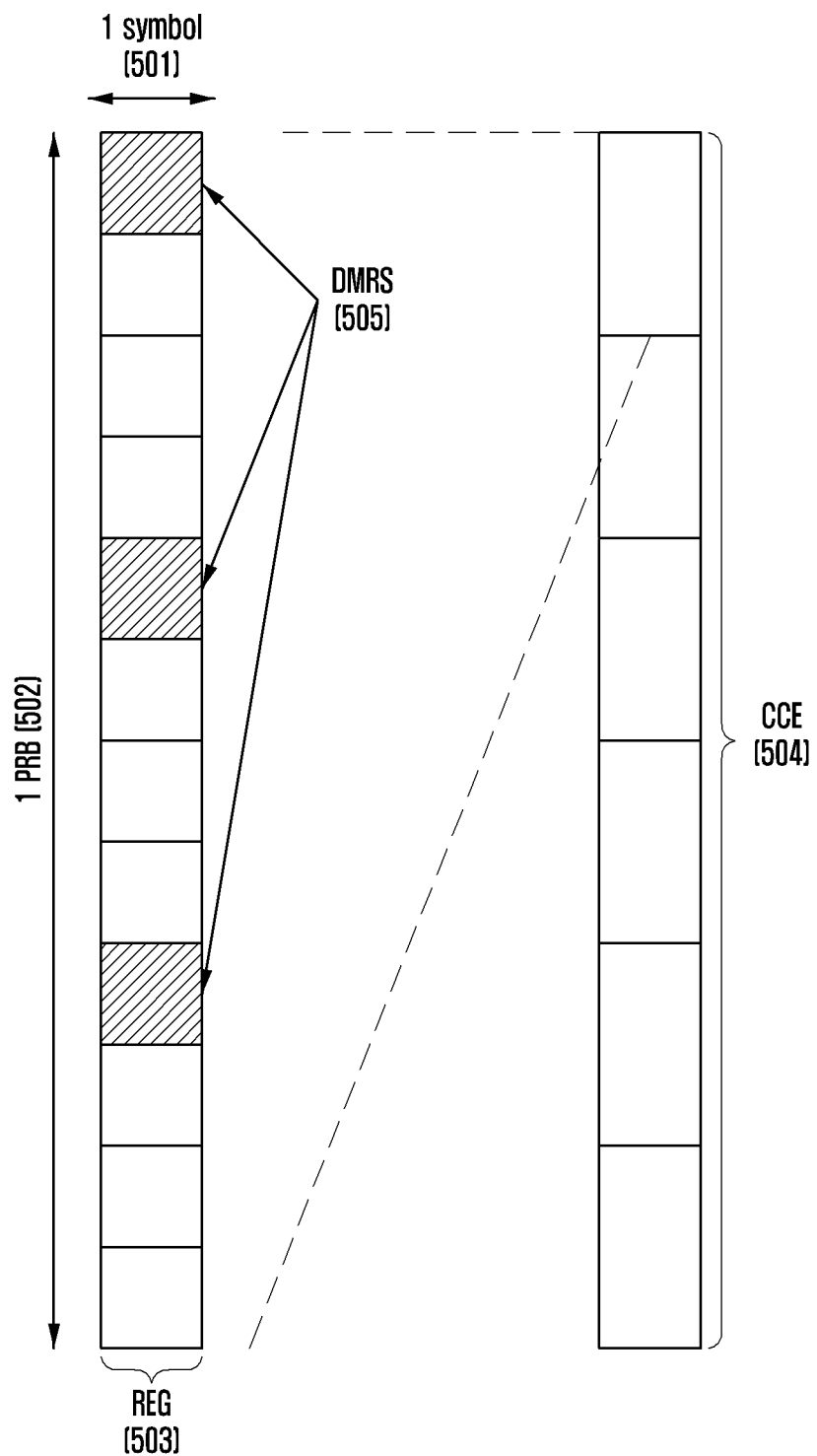
FIG. 5 is a diagram illustrating the structure of a downlink control channel in a wireless communication system according to an embodiment of the disclosure.

FIG. 5 is a diagram illustrating the structure of a downlink control channel in a wireless communication system according to an embodiment of the disclosure. That is, FIG. 5 is a diagram illustrating an example of a basic unit of time and frequency resources constituting a downlink control channel to be used in 5G according to an embodiment.

Referring to FIG. 5, the basic unit of time and frequency resources constituting a control channel may be defined as a resource element group (REG) 503. The REG 503 may be defined as 1 OFDM symbol 501 in the time domain and 1 physical resource block (PRB) 502 in the frequency domain, that is, 12 subcarriers. The base station may configure a downlink control channel allocation unit by concatenating the REGs 503.

As shown in FIG. 5, assuming that the basic unit in which the downlink control channel is allocated in 5G is a control channel element (CCE) 504, 1 CCE 504 may include a plurality of REGs 503. For example, the REG 503 shown in FIG. 5 may include 12 REs, and if 1 CCE 504 includes 6 REGs 503, 1 CCE 504 may include 72 REs. If the downlink control resource set is configured, the corresponding area may include a plurality of CCEs 504, and a specific downlink control channel may be mapped to one or more CCEs 504 according to the aggregation level (AL) in the control resource set, and may then be transmitted. The CCEs 504 in the control resource set are identified by numbers, and the numbers of the CCEs 504 may be assigned according to a logical mapping method.

The basic unit of the downlink control channel shown in FIG. 5, that is, the REG 503, may include both the REs to which the DCI is mapped and an area to which the DMRS 505, which is a reference signal for decoding the same, is mapped. As shown in FIG. 5, three DMRSs 505 may be transmitted in 1 REG 503. The number of CCEs required for transmitting the PDCCH may be 1, 2, 4, 8, or 16 depending on the aggregation level (AL), and the different numbers of CCEs may be used to implement link adaptation of the downlink control channel. For example, if AL=L, one downlink control channel may be transmitted through L CCEs.

The UE needs to detect a signal without being aware of information about the downlink control channel, and a search space indicating a set of CCEs may be defined for blind decoding. The search space is a set of downlink control channel candidates including CCEs that the UE must attempt to decode in a given aggregation level. Since there are various aggregation levels making one bundle of 1, 2, 4, 8, or 16 CCEs, the UE may have a plurality of search spaces. The search space set may be defined as a set of search spaces in all configured aggregation levels.

The search spaces may be classified into a common search space and a UE-specific search space. According to an embodiment, a specific group of UEs or all UEs may check a common search space of the PDCCH in order to receive cell-common control information such as dynamic scheduling for system information or a paging message.

For example, the UE may receive PDSCH scheduling allocation information for transmission of an SIB including cell operator information and the like by checking the common search space of the PDCCH. In the case of the common search space, since a specific group of UEs or all UEs must receive the PDCCH, the common search space may be defined as a set of predetermined CCEs. Meanwhile, the UE may receive scheduling allocation information for a UE-specific PDSCH or PUSCH by checking the UE-specific search space of the PDCCH. The UE-specific search space may be UE-specifically defined as a function of the UE identity and various system parameters.

In 5G, the parameters of the search space for the PDCCH may be configured for the UE by the base station using higher layer signaling (e.g., SIB, MIB, or RRC signaling). For example, the base station may configure the number of PDCCH candidates in each aggregation level L, monitoring periodicity for the search space, a monitoring occasion in units of symbols within the slot for the search space, the search space type (the common search space or the UE-specific search space), a combination of the DCI format and the RNTI to be monitored in the search space, the control resource set index for monitoring the search space, and the like for the UE. For example, the above-described configuration may include information as shown in Table 16 below.

TABLE 16

```
SearchSpace ::=              SEQUENCE {
-- Identity of the search space. SearchSpaceId = 0 identifies the SearchSpace
configured via PBCH (MIB) or ServingCellConfigCommon.
    searchSpaceId              SearchSpaceId,
    controlResourceSetId             ControlResourceSetId,
    monitoringSlotPeriodicityAndOffset CHOICE {
        sl1        NULL,
        sl2        INTEGER (0..1),
        sl4        INTEGER (0..3),
        sl5        INTEGER (0..4),
        sl8        INTEGER (0..7),
        sl10       INTEGER (0..9)
        sl16       INTEGER (0..15),
        sl20       INTEGER (0..19)
    }
```

TABLE 16-continued

```
  duration (monitoring duration) INTEGER (2..2559)
  monitoringSymbolsWithinSlot BIT STRING (SIZE (14))
  nrofCandidates              SEQUENCE {
    aggregationLevel1             ENUMERATED {n0, n1, n2, n3, n4, n5, n6, n8},
    aggregationLevel2             ENUMERATED {n0, n1, n2, n3, n4, n5, n6, n8},
    aggregationLevel4             ENUMERATED {n0, n1, n2, n3, n4, n5, n6, n8},
    aggregationLevel8             ENUMERATED {n0, n1, n2, n3, n4, n5, n6, n8},
    aggregationLevel16            ENUMERATED {n0, n1, n2, n3, n4, n5, n6, n8}
  },
  searchSpaceType               CHOICE {
  -- Configures this search space as common search space (CSS) and DCI formats
to monitor.
    common         SEQUENCE {
    }
    ue-specific         SEQUENCE {
    -- Indicates whether the UE monitors in this USS for DCI formats 0-0 and 1-0 or
for formats 0-1 and 1-1.
    formats           ENUMERATED {formats 0-0-And-1-0, formats 0-1-And-1-1},
    ...
}
```

The base station may configure one or more search space sets for the UE, based on configuration information. According to an embodiment, the base station may configure search space set 1 and search space set 2 for the UE, may configure DCI format A scrambled with an X-RNTI in search space set 1 so as to be monitored in the common search space, and may configure DCI format B scrambled with a Y-RNTI in the search space set 2 so as to be monitored in the UE-specific search space.

According to configuration information, the common search space or the UE-specific search space may include one or a plurality of search space sets. For example, search space set #1 and search space set #2 may be configured as the common search space, and search space set #3 and search space set #4 may be configured as the UE-specific search space.

The common search space may be classified into a specific type of search space set according to the purpose thereof. The RNTI to be monitored may differ between the determined types of search space sets. For example, the common search space types, the purposes, and the RNTIs to be monitored may be classified as shown in Table 17 below.

TABLE 17

| Search space type | Purposes | RNTI |
|---|---|---|
| Type0 CSS | PDCCH transmission for scheduling of SIB | SI-RNTI |
| Type0A CSS | PDCCH transmission for scheduling of SI other than SIB1 (SIB2 or the like) | SI-RNTI |
| Type1 CSS | PDCCH transmission for scheduling of RAR (random access response), scheduling of Msg3 retransmission, and scheduling of Msg4 | RA-RNTI, TC-RNTI |
| Type2 CSS | Paging | P-RNTI |
| Type3 CSS | Transmission of group control information | INT-RNTI, SFI-RNTI, TPC-PUSCH-RNTI, TPC-PUCCH-RNTI, TPC-SRS-RNTI |
|  | PDCCH transmission for scheduling of data for PCell | C-RNTI, MCS-C-RNTI, CS-RNTI |

Meanwhile, the following combinations of DCI formats and RNTIs may be monitored in the common search space. The disclosure is not limited to the following examples.

DCI format 0_0/1_0 with CRC scrambled by C-RNTI, CS-RNTI, SP-CSI-RNTI, RA-RNTI, TC-RNTI, P-RNTI, and SI-RNTI DCI format 2_0 with CRC scrambled by SFI-RNTI DCI format 2_1 with CRC scrambled by INT-RNTI DCI format 2_2 with CRC scrambled by TPC-PUSCH-RNTI and TPC-PUCCH-RNTI DCI format 2_3 with CRC scrambled by TPC-SRS-RNTI In the UE-specific search space, the following combinations of DCI formats and RNTIs may be monitored. The disclosure is not limited to the following examples.

DCI format 0_0/1_0 with CRC scrambled by C-RNTI, CS-RNTI, and TC-RNTI

DCI format 1_0/1_1 with CRC scrambled by C-RNTI, CS-RNTI, and TC-RNTI

The specified RNTIs may follow the definitions and usages as follows.

Cell RNTI (C-RNTI) for scheduling of UE-specific PDSCH

Temporary cell RNTI (TC-RNTI) for scheduling of UE-specific PDSCH

Configured scheduling RNTI (CS-RNTI) for scheduling of semi-statically configured UE-specific PDSCH Random access RNTI (RA-RNTI) for scheduling of PDSCH in random access stage Paging RNTI (P-RNTI) for scheduling of PDSCH in which paging is transmitted System information RNTI (SI-RNTI) for scheduling of PDSCH in which system information is transmitted Interruption RNTI (INT-RNTI) for informing of puncturing on PDSCH Transmit power control for PUSCH RNTI (TPC-PUSCH-RNTI) for indicating power control command for PUSCH Transmit power control for PUCCH RNTI (TPC-PUCCH-RNTI) for indicating power control command for PUCCH Transmit power control for SRS RNTI (TPC-SRS-RNTI) for indicating power control command for SRS In an embodiment, the above-described DCI formats may be defined as shown in Table 18 below.

TABLE 18

| DCI format | Usage |
| --- | --- |
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmission by one or more UEs |

According to an embodiment, a plurality of search space sets may be configured using different parameters (e.g., the parameters in Table 10) in 5G. Therefore, a set of search space sets monitored by the UE may differ at each time. For example, if search space set #1 is configured as the X-slot periodicity, if search space set #2 is configured as the Y-slot periodicity, and if X and Y are different, the UE may monitor both search space set #1 and search space set #2 in a specific slot, and may monitor one of search space set #1 and search space set #2 in a specific slot.

If a plurality of search space sets is configured for the UE, the following conditions may be considered in order to determine the search space set to be monitored by the UE.

[Condition 1: Limit maximum number of PDCCH candidates]

The number of PDCCH candidates capable of being monitored per slot may not exceed $M^\mu$. $M^\mu$ may be defined as the maximum number of PDCCH candidates per slot in the cell in which the subcarrier spacing is set to $15 \cdot 2^\mu$ kHz, and may be defined as shown in Table 19 below.

TABLE 19

| $\mu$ | Maximum number of PDCCH candidates per slot and per serving cell ($M^\mu$) |
| --- | --- |
| 0 | 44 |
| 1 | 36 |
| 2 | 22 |
| 3 | 20 |

[Condition 2: Limit maximum number of CCEs]

The number of CCEs constituting the entire search space per slot (the entire search space may indicate a set of all CCEs corresponding to the union area of a plurality of search space sets) may not exceed $C^\mu$. $C^\mu$ may be defined as the maximum number of CCEs per slot in the cell in which the subcarrier spacing is set to $15 \cdot 2^\mu$ kHz, and may be defined as shown in Table 20 below.

TABLE 20

| $\mu$ | Maximum number of CCEs per slot and per serving cell ($C^\mu$) |
| --- | --- |
| 0 | 56 |
| 1 | 56 |
| 2 | 48 |
| 3 | 32 |

For convenience of explanation, the situation in which both condition 1 and condition 2 are satisfied at a specific time may be defined as "condition A." Therefore, the case in which condition A is not satisfied may indicate the case in which at least one of condition 1 and condition 2 described above is not satisfied.

Condition A may not be satisfied at a specific time depending on the configurations of the search space sets of the base station. If condition A is not satisfied at a specific time, the UE may select and monitor only some of the search space sets configured to satisfy condition A at that time, and the base station may transmit a PDCCH to the selected search space set.

According to an embodiment, selection of some search spaces from among the overall configured search space sets may be performed according to the following methods.

[Method 1]

If condition A for the PDCCH is not satisfied at a specific time (slot), the UE (or the base station) may preferentially select the search space set in which the search space type is configured as a common search space from among the search space sets existing at the corresponding time, instead of the search space set in which the search space type is configured as a UE-specific search space.

If all search space sets configured as the common search space are selected (i.e., if condition A is satisfied even after selecting all search spaces configured as the common search space), the UE (or the base station) may select the search space sets configured as the UE-specific search space. In this case, if there are a plurality of search space sets configured as the UE-specific search space, the search space set having a lower search space set index may have a higher priority. The UE or the base station may select the UE-specific search space sets within a range in which condition A is satisfied in consideration of priority.

Hereinafter, methods for allocating time and frequency resources for transmission of data in NR will be described.

NR may provide detailed frequency domain resource allocation (FD-RA) methods as follows, in addition to frequency domain resource candidate allocation through BWP indication.

Figure 6:
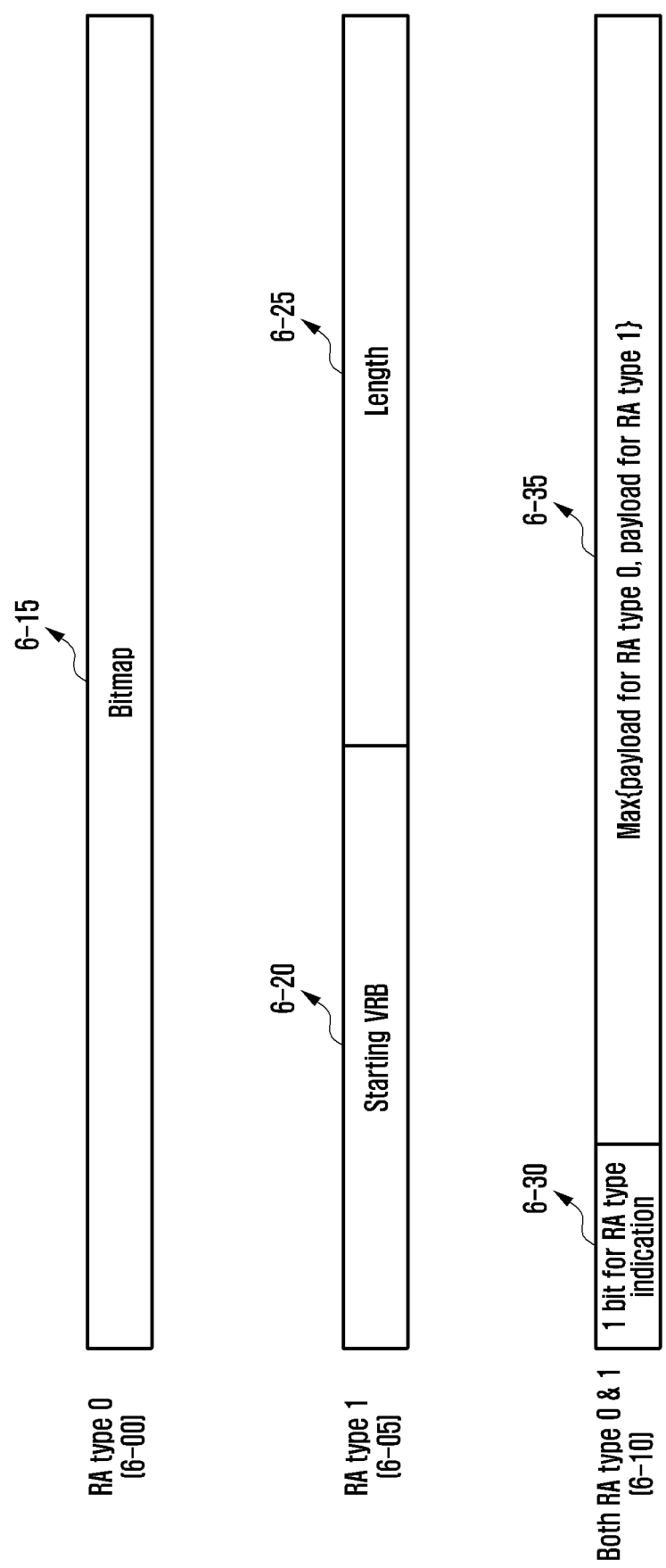
FIG. 6 is a diagram illustrating an example of allocating frequency domain resources of a physical downlink shared channel (PDSCH) in a wireless communication system according to an embodiment of the disclosure.

FIG. 6 is a diagram illustrating an example of frequency domain resource allocation of a physical downlink shared channel (PDSCH) in a wireless communication system according to an embodiment of the disclosure.

FIG. 6 is a diagram illustrating three frequency domain resource allocation methods of type 0 (6-00), type 1 (6-05), and dynamic switch 6-10, which may be configured through a higher layer in NR.

Referring to FIG. 6, in the case where a UE is configured to use only resource type 0 through higher layer signaling (6-00), some downlink control information (DCI) for allocating a PDSCH to the UE has a bitmap of NRBG bits. The conditions for this will be described later. In this case, NRBG indicates the number of resource block groups (RBGs) determined, as shown in Table 21 below, according to the size of a BWP allocated by a BWP indicator and the higher layer parameter "rbg-Size," and data is transmitted in the RBG represented as "1" using a bitmap.

TABLE 21

| Bandwidth Part Size | Configuration 1 | Configuration 2 |
| --- | --- | --- |
| 1-36 | 2 | 4 |
| 37-72 | 4 | 8 |
| 73-144 | 8 | 16 |
| 145-275 | 16 | 16 |

In the case where the UE is configured to use only resource type 1 through higher layer signaling (6-05), some DCI for allocating PDSCHs to the UE has frequency domain resource allocation information including $\lceil \log_2(N_{RB}^{DL,BWP}(N_{RB}^{DL,BWP}+1)/2 \rceil$ bits. The conditions for this will be described again later. The base station may configure starting VRB 6-20 and the length 6-24 of the frequency domain resource subsequent thereto.

If the UE is configured to use both resource type 0 and resource type 1 through higher layer signaling (6-10), some DCI for allocating the PDSCHs to the corresponding UE has frequency domain resource allocation information including bits of a large value 6-35 among the payload 6-15 for configuring resource type 0 and the payloads 6-20 and 6-25 for configuring resource type 1. The conditions for this will be described again later. In this case, one bit 6-30 may be added to the foremost part (MSB) of the frequency domain resource allocation information in the DCI, and bit 0 indicates that resource type 0 is to be used, and bit 1 indicates that resource type 1 is to be used.

Hereinafter, a time domain resource allocation method for a data channel in the next-generation mobile communication system (the 5G or NR system) will be described.

The base station may configure a table about time domain resource allocation information for a downlink data channel {physical downlink shared channel (PDSCH)} and an uplink data channel {physical uplink shared channel (PUSCH)} for the UE through higher layer signaling (e.g., RRC signaling). A table including up to maxNrofDL-Allocations=16 entries may be configured for the PDSCH, and a table including up to maxNrofUL-Allocations=16 entries may be configured for the PUSCH. In an embodiment, the time domain resource allocation information may include PDCCH-to-PDSCH slot timing (corresponding to the time interval in units of slots between the time at which the PDCCH is received and the time at which the PDSCH scheduled by the received PDCCH is transmitted, which is denoted as K0), PDCCH-to-PUSCH slot timing (corresponding to the time interval in units of slots between the time at which the PDCCH is received and the time at which the PUSCH scheduled by the received PDCCH is transmitted, which is denoted as K2), information on the location and length of a start symbol in which the PDSCH or PUSCH is scheduled in the slot, a mapping type of the PDSCH or PUSCH, and the like. For example, the information shown in Table 22 or Table 23 below may be notified of to the UE from the base station.

TABLE 22

PDSCH-TimeDomainResourceAllocationList information element

PDSCH-TimeDomainResourceAllocationList ::= SEQUENCE
(SIZE(1..maxNrofDL-Allocations)) OF PDSCH-
TimeDomainResourceAllocation
PDSCH-TimeDomainResourceAllocation ::= SEQUENCE {
  k0  INTEGER(0..32)  OPTIONAL, -- Need S
  (PDCCH-to-PDSCH timing, per slot)
  mappingType        ENUMERATED {typeA, typeB},
  (PDSCH mapping type)
  startSymbolAndLength      INTEGER (0..127)
  (start symbol and length of the PDSCH)
}

TABLE 23

PUSCH-TimeDomainResourceAllocation information element

PUSCH-TimeDomainResourceAllocationList ::= SEQUENCE
(SIZE(1..maxNrofUL-Allocations)) OF PUSCH-
TimeDomainResourceAllocation
PUSCH-TimeDomainResourceAllocation ::= SEQUENCE {
  k2  INTEGER(0..32)  OPTIONAL, -- Need S
  (PDCCH-to-PUSCH timing, per slot)
  mappingType        ENUMERATED {typeA, typeB},
  (PUSCH mapping type)
  startSymbolAndLength      INTEGER (0..127)
  (start symbol and length of the PUSCH)
}

The base station may notify the UE of one of the entries in the table for the time domain resource allocation information described above through L1 signaling (e.g., DCI) (for example, it may be indicated by a field "time domain resource allocation" in DCI). The UE may obtain time domain resource allocation information for the PDSCH or the PUSCH, based on the DCI received from the base station.

Figure 7:
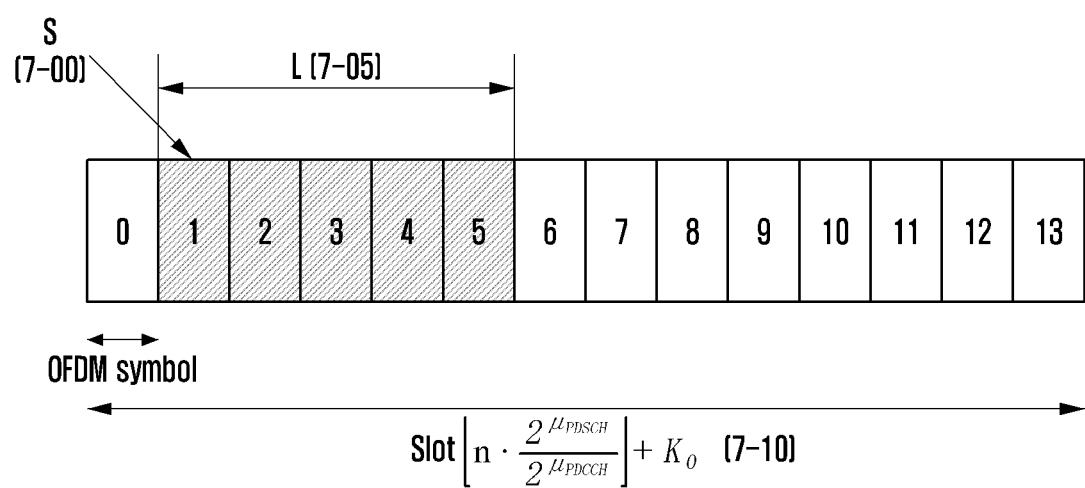
FIG. 7 is a diagram illustrating an example of allocating time domain resources of a PDSCH in a wireless communication system according to an embodiment of the disclosure.

FIG. 7 is a diagram illustrating an example of allocating time domain resources of a PDSCH in a wireless communication system according to an embodiment of the disclosure.

Referring to FIG. 7, the base station may indicate the time domain location of a PDSCH resource according to the subcarrier spacing (SCS) ($\mu_{PDSCH}$ and $\mu_{PDCCH}$) of a data channel and a control channel configured using a higher layer, a scheduling offset value ($K_0$), a starting location 7-00 of OFDM symbols within one slot 7-10 dynamically indicated through DCI, and the length 7-05 thereof.

Figure 8:
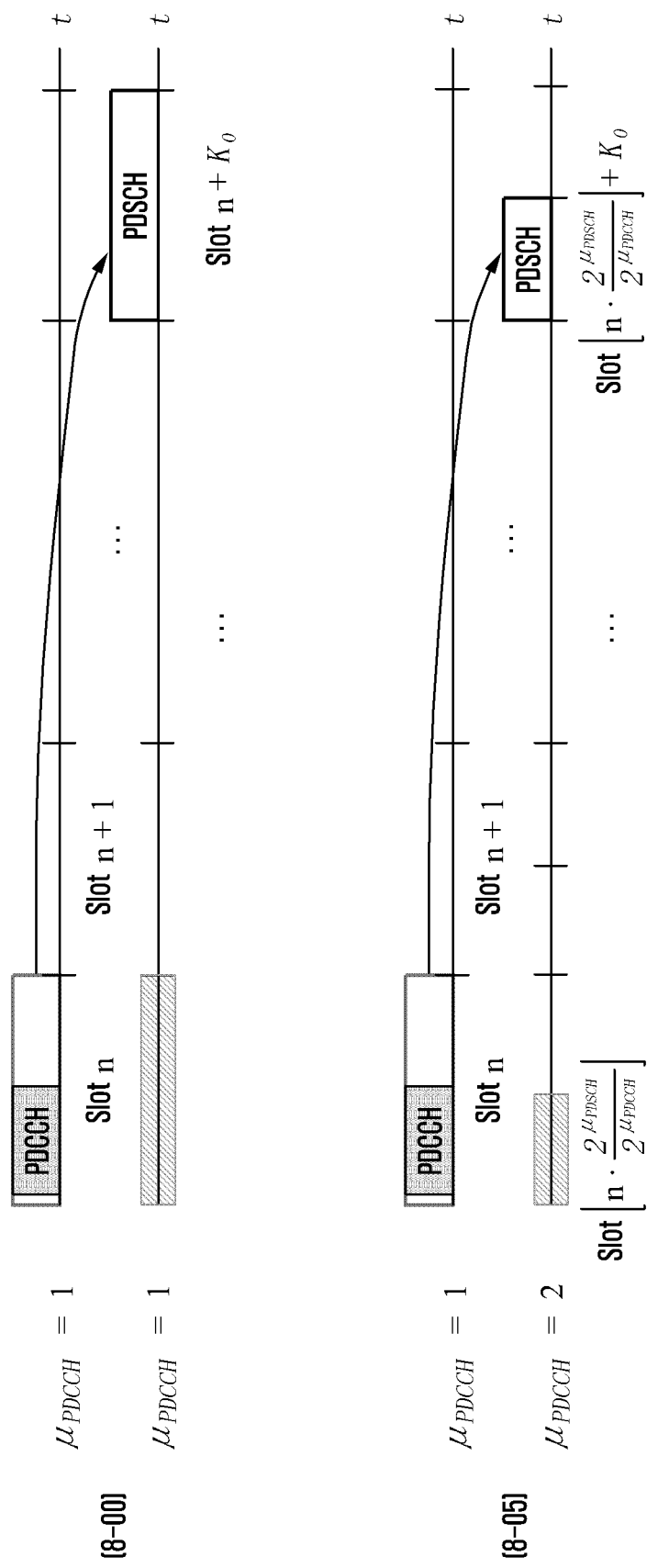
FIG. 8 is a diagram illustrating an example of allocating time domain resources depending on subcarrier spacings of a data channel and a control channel in a wireless communication system according to an embodiment of the disclosure.

FIG. 8 is a diagram illustrating an example of allocating time domain resources according to subcarrier spacing of a data channel and a control channel in a wireless communication system according to an embodiment of the disclosure.

Referring to FIG. 8, if the subcarrier spacing of the data channel is the same as the subcarrier spacing of the control channel ($\mu_{PDSCH}=\mu_{PDCCH}$) (8-00), the slot numbers for the data and the control are the same. Accordingly, the base station and the UE may recognize the occurrence of a scheduling offset according to a predetermined slot offset ($K_0$). On the other hand, if the subcarrier spacing of the data channel is different from the subcarrier spacing of the control channel ($\mu_{PDSCH}\ne\mu_{PDCCH}$) (8-05), the slot numbers for the data and the control are different from each other. Accordingly, the base station and the UE may recognize the occurrence of a scheduling offset according to a predetermined slot offset ($K_0$), based on the subcarrier spacing of the PDCCH.

Next, a beam configuration method in order for the base station to transmit control information and data to the UE will be described. In the disclosure, for the convenience of explanation, a process of transmitting control information through the PDCCH may be expressed as "transmitting the PDCCH," and a process of transmitting data through the PDSCH may be expressed as "transmitting the PDSCH."

Figure 9:
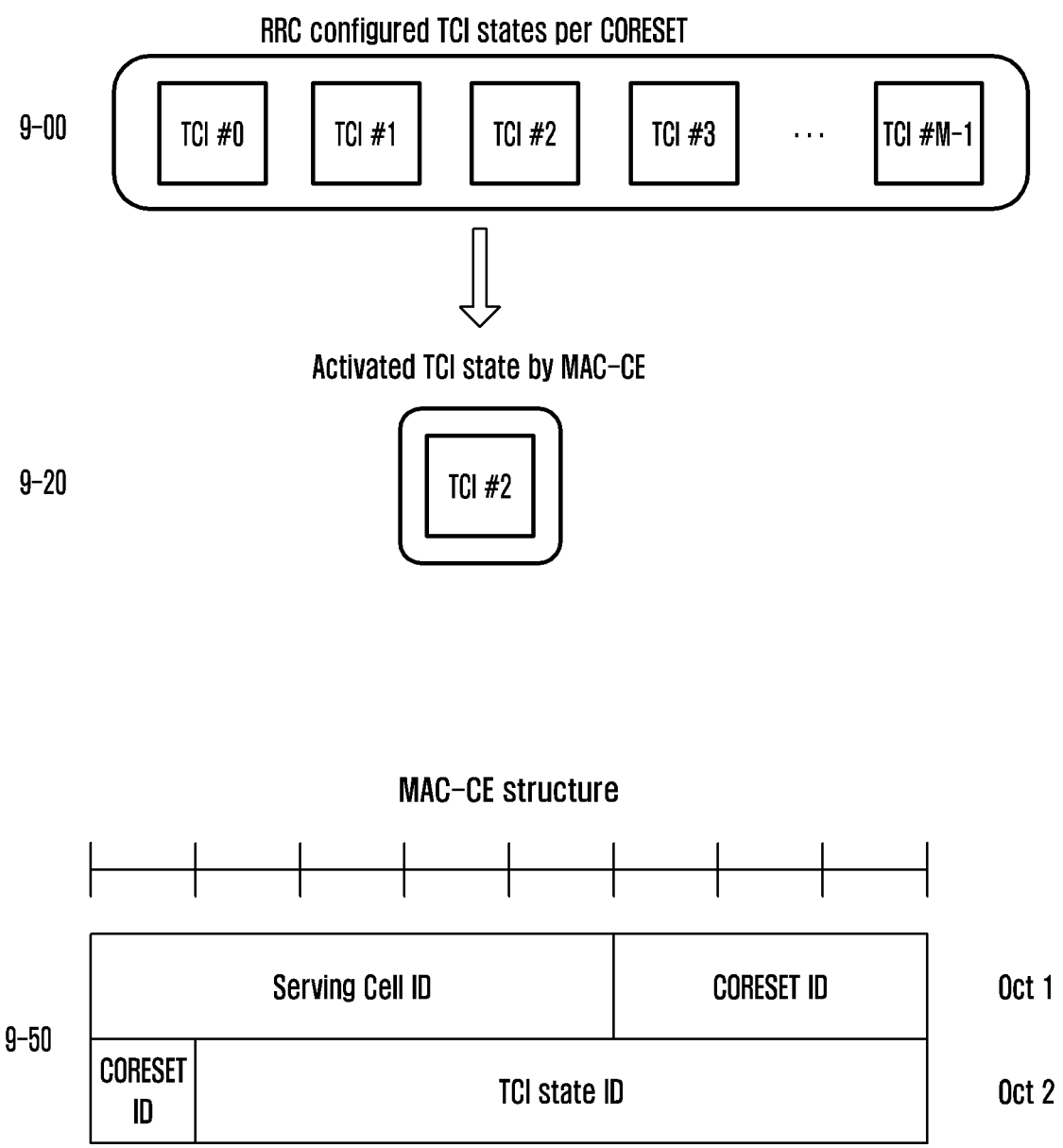
FIG. 9 is a diagram illustrating an example of a configuration of an antenna port for cooperative communication according to an embodiment of the disclosure.

FIG. 9 is a diagram illustrating an example of the configuration of an antenna port for cooperative communication according to an embodiment of the disclosure.

Firstly, a beam configuration method for the PDCCH will be described. Referring to FIG. 9, it shows a process of configuring and activating a beam of the PDCCH. Firstly, the list of TCI states for each CORESET may be indicated through a higher layer list such as RRC or the like (9-00). The list of TCI states may be indicated by "tci- StatesPDCCH-ToAddList" and/or "tci-StatesPDCCH-ToReleaseList" in Table 8. Next, one of the TCI states in the list configured for each CORESET may be activated through a MAC-CE (9-20). Reference numeral 9-50 shows an example of a MAC-CE structure for activating the TCI state of the PDCCH. The definition of each field in the MAC CE and available values for each field are as follows.

which is a higher layer parameter in the CORESET configured for reception of the DCI. If "tci-PresentinDCI" is configured as "enabled" in the higher layer, the UE may identify the TCI field having 3 bits of information, thereby determining the direction of a beam associated with the TCI state activated in the DL BWP or the scheduled component carrier and the DL-RS.

---

Serving Cell ID: This field indicates the identity of the Serving Cell for which the MAC CE applies. The length of the field is 5 bits;
CORESET ID: This field indicates a Control Resource Set identified with ControlResourceSetId as specified in TS 38.331 [5], for which the TCI State is being indicated. In case the value of the field is 0, the field refers to the Control Resource Set configured by controlResourceSetZero as specified in TS 38.331 [5]. The length of the field is 4 bits;
TCI State ID: This field indicates the TCI state identified by TCI-StateId as specified in TS 38.331 [5] applicable to the Control Resource Set identified by CORESET ID field. If the field of CORESET ID is set to 0, this field indicates a TCI-StateId for a TCI state of the first 64 TCI-states configured by tci-States-ToAddModList and tci-States-ToReleaseList in the PDSCH-Config in the active BWP. If the field of CORESET ID is set to the other value than 0, this field indicates a TCI-StateId configured by tci-StatesPDCCH-ToAddList and tci-StatesPDCCH-ToReleaseList in the controlResourceSet identified by the indicated CORESET ID. The length of the field is 7 bits.

---

Figure 10:
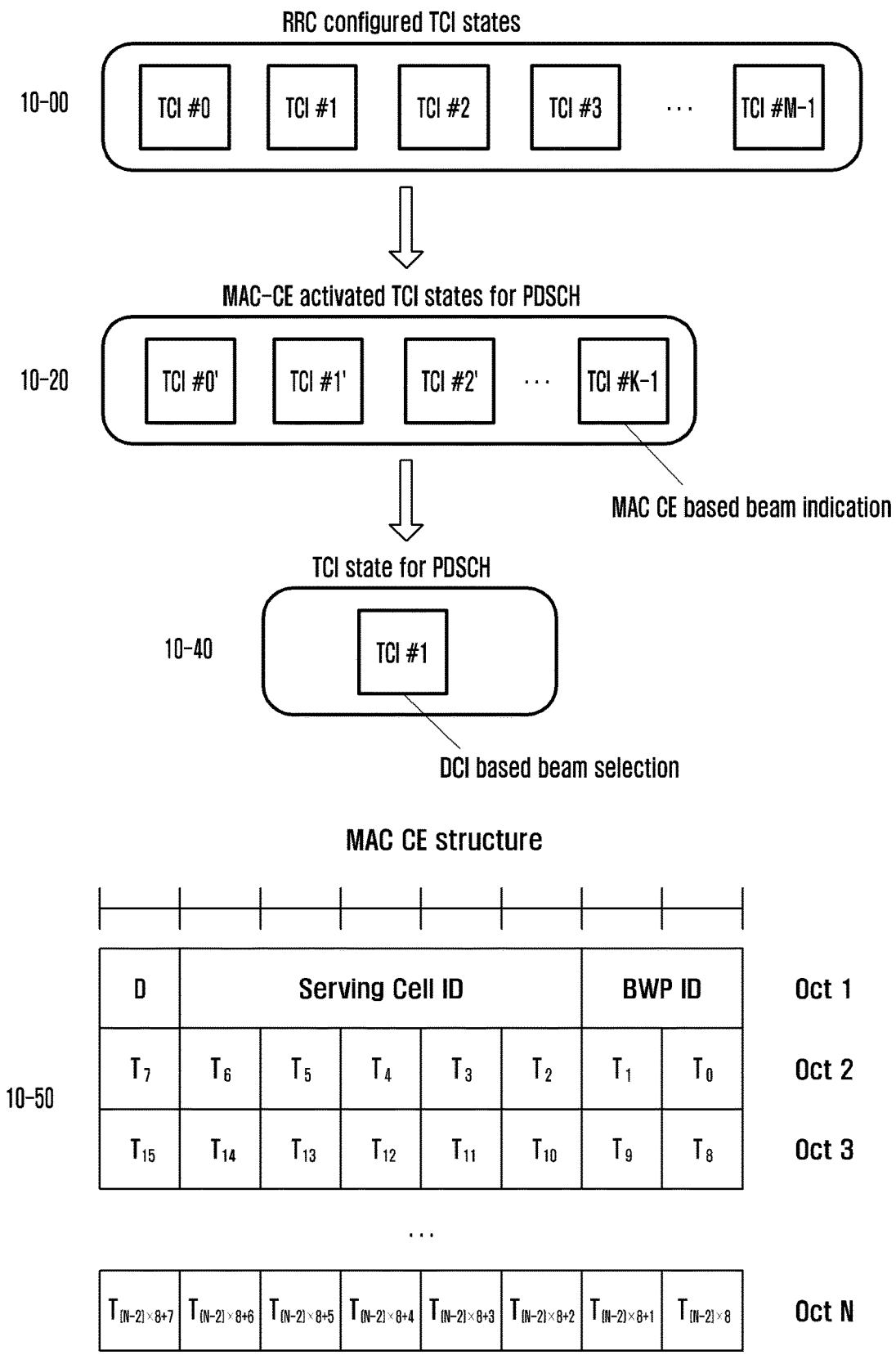
FIG. 10 is a diagram illustrating a process of configuring and activating a beam of a PDSCH according to an embodiment of the disclosure.

FIG. 10 is a diagram illustrating a process of configuring and activating a beam of a PDSCH according to an embodiment of the disclosure.

Next, a beam configuration method for the PDSCH will be described. Referring to FIG. 10, a process of configuring and activating a beam of the PDSCH is illustrated. The list of TCI states for the PDSCH may be indicated through a higher layer list such as RRC or the like (10-00). The list of TCI states may be indicated by, for example, "tci-States-ToAddModList" and/or "tci-StatesToReleaseList" in PDSCH-Config IE for each BWP. Next, some of the TCI states in the list may be activated through a MAC-CE (10-20). The maximum number of activated TCI states may be determined according to the capability reported by the UE. Reference numeral 10-50 shows an example of a MAC-CE structure for activation/deactivation of the TCI state of the PDSCH based on Rel-15.

The definition of each field in the MAC CE and available values for each field are as follows.

In LTE and NR, the UE performs a procedure of reporting capability supported by the UE to a serving base station while being connected to the base station, which will be referred to as "UE capability (report)" in the following description. The base station may transmit a UE capability enquiry message requesting capability reporting to the UE in a connected state. The message may include a request for UE capability for each RAT type by the base station. The request for each RAT type may include information on a requested frequency band. In addition, the UE capability enquiry message may be transmitted while requesting a plurality of RAT types through a single RRC message container, or a plurality of UE capability enquiry messages including requests for respective RAT types may be included to then be transmitted to the UE. That is, the UE capability enquiry may be repeated multiple times, and the UE may configure a UE capability information message corresponding thereto, and may report the same multiple times. In the next-generation mobile communication system, the request for

---

Serving Cell ID: This field indicates the identity of the Serving Cell for which the MAC CE applies. The length of the field is 5 bits;
BWP ID: This field indicates a DL BWP for which the MAC CE applies as the codepoint of the DCI bandwidth part indicator field as specified in TS 38.212 [9]. The length of the BWP ID field is 2 bits;
Ti: i) If there is a transmission configuration indiation (TCI) state with TCI-StateId i as specified in TS 38.331 [5], this field indicates the activation/deactivation status of the TCI state with TCI-StateId i, otherwise MAC entity shall ignore the Ti field. The Ti field is set to 1 to indicate that the TCI state with TCI-StateId i shall be activated and mapped to the codepoint of the DCI Transmission Configuration Indication field, as specified in TS 38.214 [7]. The Ti field is set to 0 to indicate that the TCI state with TCI-StateId i shall be deactivated and is not mapped to the codepoint of the DCI Transmission Configuration Indication field. The codepoint to which the TCI State is mapped is determined by its ordinal position among all the TCI States with Ti field set to 1, i.e. the first TCI State with Ti field set to 1 shall be mapped to the codepoint value 0, second TCI State with Ti field set to 1 shall be mapped to the codepoint value 1 and so on. The maximum number of activated TCI states is 8;
R: Reserved bit, set to 0.

---

In the case where the UE receives DCI format 1_1 or DCI format 1_2, a PDSCH may be received by one beam among the TCI states activated through the MAC-CE, based on information of a transmission configuration indication (TCI) field in the DCI (10-40). The presence or absence of the TCI field may be determined by the value "tci-PresentinDCI,"

UE capability may be performed for MR-DC, as well as NR, LTE, and EN-DC. For reference, the UE capability enquiry message is generally transmitted in the initial stage after the UE is connected, but the base station is able to request the UE capability under any condition as necessary.

In the above operation, the UE receiving the request for reporting UE capability from the base station configures UE capability according to the RAT type and the band information requested by the base station. A method of configuring the UE capability by the UE in an NR system will be summarized below.

1. If the UE receives a list of LTE and/or NR bands through a UE capability request from the base station, the UE configures a band combination (BC) for EN-DC and NR stand-alone (SA). That is, the UE configures a list of BC candidates for EN-DC and NR SA, based on the bands requested by the base station using "FreqBandList." In addition, the bands have priority in the order as described in "FreqBandList."

2. If the base station requests a UE capability report by setting "eutra-nr-only" flag or "eutra" flag, the UE completely removes the NR SA BCs from the configured list of BC candidates. This operation may be performed only when an LTE base station (eNB) requests "eutra" capability.

3. Thereafter, the UE removes fallback BCs from the list of BC candidates configured in the above operation. The fallback BC corresponds to the case in which the band corresponding to at least one SCell is removed from a certain super set BC, and the fallback BC may be omitted because the super set BC is capable of covering the fallback BC. This operation is also applied to MR-DC, i.e., LTE bands. The remaining BCs after this operation constitute a final "candidate BC list."

4. The UE selects the BCs to be reported, which conform to the requested RAT type, from the final "candidate BC list." In this operation, the UE configures "supportedBandCombinationList" in a predetermined order. In other words, the UE configures the BCs and UE capability to be reported in the preconfigured order of the RAT types (nr→eutra, nr→eutra). In addition, the UE configures "featureSetCombination" for the configured "supportedBandCombinationList" and configures a list of "candidate feature set combinations" from the candidate BC list from which the list of the fallback BCs (including capabilities in the equal or lower level) is removed. The "candidate feature set combination" may include the feature set combinations for BCs both of NR and EUTRA-NR, and may be obtained from the feature set combinations of the "UE-NR-Capabilities" and "UE-MRDC-Capabilities" containers.

5. In addition, if the requested RAT type is "eutra-nr" and has affects, "featureSetCombinations" is included in both containers of "UE-MRDC-Capabilities" and "UE-NR-Capabilities." However, the feature set of NR is included only in "UE-NR-Capabilities."

After the UE capability is configured, the UE transmits a UE capability information message including the UE capability to the base station. Then, the base station performs appropriate scheduling and transmission/reception management for the UE, based on the UE capability received from the UE.

Figure 11:
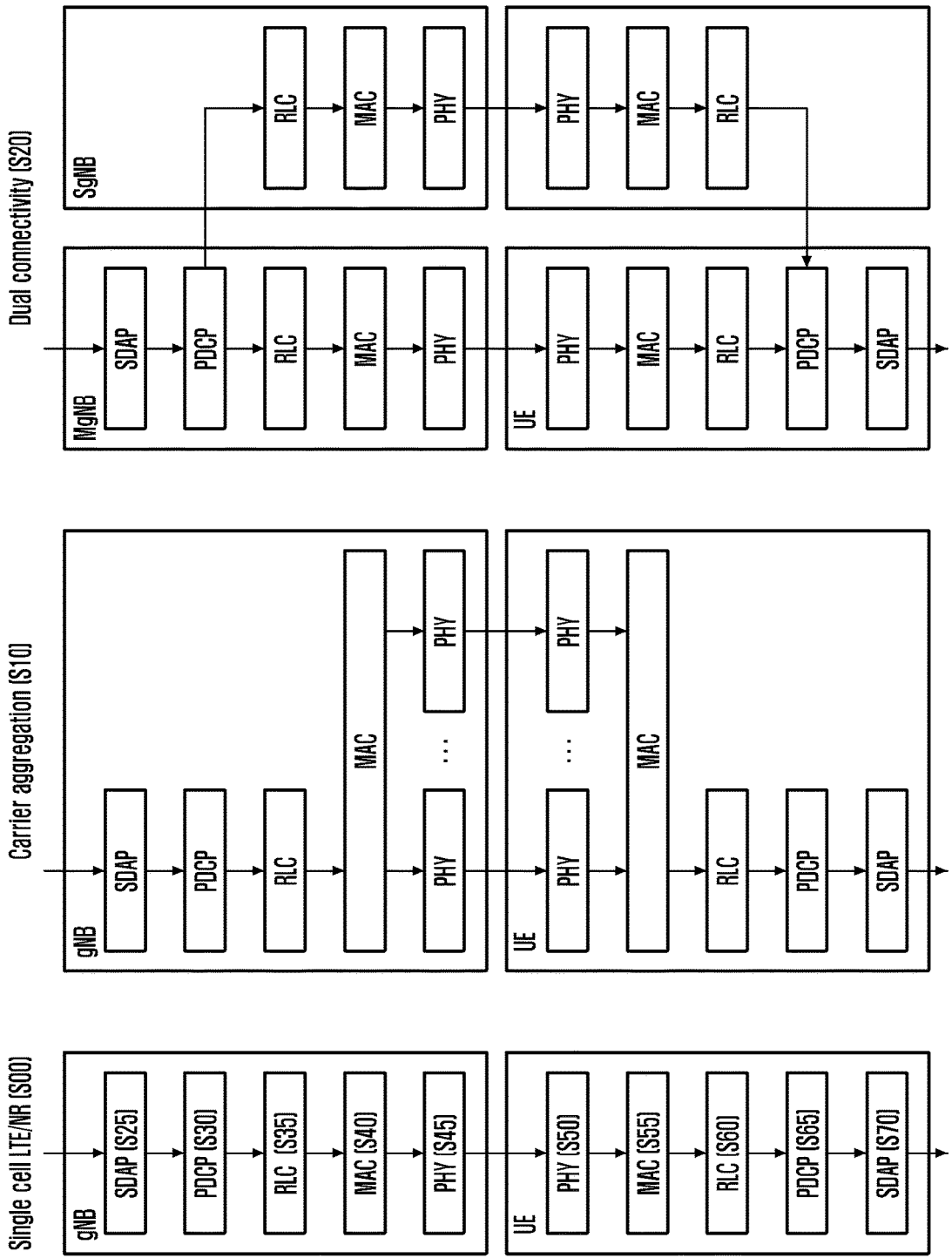
FIG. 11 is a diagram illustrating a radio protocol structure of a base station and a UE in cases of a single cell, carrier aggregation, and dual connectivity, respectively according to an embodiment of the disclosure.

FIG. 11 is a diagram illustrating the radio protocol structure of a base station and a UE in the cases of a single cell, carrier aggregation, and dual connectivity, respectively according to an embodiment of the disclosure.

Referring to FIG. 11, the radio protocol of the next-generation mobile communication system includes NR service data adaption protocol (SDAP) S25 or S70, NR packet data convergence protocol (PDCP) S30 or S65, NR radio link control (RLC) S35 or S60, and NR medium access control (MAC) S40 or S55 in a UE and an NR base station, respectively.

The primary functions of the NR SDAP S25 or S70 may include some of the following functions.

Transfer of user plane data
Mapping between QoS flow and DRB for both DL and UL
Marking QoS flow ID in both DL and UL packets
Mapping reflective QoS flow to DRB for UL SDAP PDUs With regard to the SDAP layer entity, the UE may receive a configuration indicating whether or not to use a header of the SDAP layer entity or whether or not to use functions of the SDAP layer entity for each PDCP layer entity, for each bearer, or for each logical channel through an RRC message. In the case where the SDAP header is configured, a 1-bit NAS reflective QoS configuration indicator and a 1-bit AS reflective QoS configuration indicator of the SDAP header may instruct the UE to update or reconfigure mapping information between the QoS flow and the data bearers in the uplink and downlink. The SDAP header may include QoS flow ID information indicating QoS. The QoS information may be used as data processing priority, scheduling information, or the like in order to support effective services.

The primary functions of the NR PDCP S30 or S65 may include some of the following functions.

Header compression and decompression (ROHC only)
Transfer of user data
In-sequence delivery of upper layer PDUs
Out-of-sequence delivery of upper layer PDUs
Sequence reordering (PDCP PDU reordering for reception)
Duplicate detection of lower layer SDUs
Retransmission of PDCP SDUs
Ciphering and deciphering
Timer-based SDU discard in uplink The reordering function of the NR PDCP layer entity denotes a function of reordering PDCP PDUs received from a lower layer, based on a PDCP sequence number (SN), which may include a function of transmitting data to a higher layer in the reordered order, may include a function of directly transmitting data without consideration of an order, may include a function of reordering the sequence and recording lost PDCP PDUs, may include a function of sending a status report of the lost PDCP PDUs to a transmitting end, and may include a function of making a request for retransmission of the lost PDCP PDUs.

The primary functions of the NR RLC S35 or S60 may include some of the following functions.

Data transfer function (transfer of upper layer PDUs)
In-sequence delivery of upper layer PDUs
Out-of-sequence delivery of upper layer PDUs
ARQ function (error correction through ARQ)
Concatenation, segmentation, and reassembly of RLC SDUs
Re-segmentation of RLC data PDUs
Reordering of RLC data PDUs
Duplicate detection
Protocol error detection
RLC SDU discard
RLC re-establishment The in-sequence delivery function of the NR RLC layer entity denotes a function of transferring RLC SDUs received from a lower layer to a higher layer in sequence, which may include a function of, if one original RLC SDU is divided into a plurality of RLC SDUs and received, reassembling and transmitting the same, may include a function of reordering the received RLC PDUs, based on an RLC sequence number (SN) or a PDCP sequence number (SN), may include a function of reordering the sequence and recording lost RLC PDUs, may include a function of sending a status report of the lost RLC PDUs to a transmitting end, may include a function of making a request for retransmission of the lost RLC PDUs, may include a function of, if there is a lost RLC SDU, transmitting only the RLC SDUs prior to the lost RLC SDU to a higher layer in sequence, may include a function of, if a predetermined timer expires even though there is a lost RLC SDU, transmitting all RLC SDUs received before the timer starts to a higher layer in sequence, or may include a function of, if a predetermined timer expires even though there is a lost RLC SDU, transmitting all RLC SDUs received until the present to a higher layer in sequence. In addition, the RLC PDUs may be processed in the order of reception (in the order of arrival regardless of a serial number or a sequence number thereof), and may be transmitted to the PDCP layer entity in an out-of-sequence delivery mariner. In the case of segments, the segments, which are stored in the buffer or will be received later, may be received and reconfigured into one complete RLC PDU, and the RLC PDU may be processed and transmitted to the PDCP layer entity. The NR RLC layer may not include a concatenation function, which may be performed in the NR MAC layer or may be replaced with a multiplexing function of the NR MAC layer.

The out-of-sequence delivery of the NR RLC layer entity denotes a function of directly transmitting RLC SDUs received from a lower layer to a higher layer regardless of sequence, which may include a function of, if one original RLC SDU is divided into a plurality of RLC SDUs and is received, reassembling and transmitting the same, and may include a function of storing and ordering RLC SNs or PDCP SNs of the received RLC PDUs, thereby recording the lost RLC PDUs.

The NR MAC S40 or S55 may be connected to a plurality of NR RLC layer entities configured in a single UE, and the primary functions of the NR MAC may include some of the following functions.

Mapping between logical channels and transport channels
Multiplexing/demultiplexing of MAC SDUs
Scheduling information reporting
HARQ function (error correction through HARQ)
Priority handling between logical channels of one UE
Priority handling between UEs by means of dynamic scheduling
MBMS service identification
Transport format selection
Padding The NR PHY layers S45 and S50 may perform operations of channel-coding and modulating the higher layer data into OFDM symbols and transmitting the same through a radio channel, or operations of demodulating and channel-decoding the OFDM symbols received through the radio channel and transmitting the same to the higher layer.

The detailed structures of the radio protocols may be changed in various ways according to a carrier (or cell) operating scheme. For example, in the case where the base station transmits data to the UE, based on a single carrier (or cell), the base station and the UE use a single protocol structure for the respective layers as shown in S00. On the other hand, in the case where the base station transmits data to the UE, based on carrier aggregation (CA) using multiple carriers in a single TRP, the base station and the UE use a protocol structure in which a single structure is provided until the RLC layer and in which the PHY layer is multiplexed through the MAC layer as shown in S10. As another example, in the case where the base station transmits data to the UE, based on dual connectivity (DC) using multiple carriers in multiple TRPs, the base station and the UE use a protocol structure in which a single structure is provided until the RLC layer and in which the PHY layer is multiplexed through the MAC layer as shown in S20.

Meanwhile, if the interval between the symbol in which transmission of the PDCCH ends and the start symbol of the PDSCH scheduled by the PDCCH is less than a specific threshold, the UE may not complete decoding of the PDCCH at the time of receiving the PDSCH. This indicates that beam information for the reception of the PDSCH, which is indicated by the DCI of the PDCCH, fails to be received. In this situation, the base station and the UE may specify a default beam for the reception of the PDSCH. That is, in the above situation, the base station transmits the PDSCH using the specified default beam, and the UE may perform buffering using the specified default beam. If the UE determines, after decoding of the PDCCH, that there is a PDSCH scheduled before decoding of the PDCCH, the decoding of the PDSCH may be performed from the signal buffered according to the default beam. In this case, the aforementioned threshold may be the value "timeDurationForQCL" reported as the UE capability. Meanwhile, the above default beam operation may be limited to the case in which one or more TCI states in the TCI state list 10-00 configured for the PDSCH include "QCL-TypeD," that is, the case in which the reception beam of the UE is configured. In this case, the default beam may be the beam configured in the CORESET (e.g., CORESET #0) corresponding to the lowest ID, among the CORESETs corresponding to the monitored search space of the latest slot, based on the PDSCH reception slot. That is, with the PDSCH reception slot as a reference point, the default beam may be the beam configured in the CORESET (e.g., CORESET #0) corresponding to the lowest ID, among the CORESETs corresponding to the monitored search space of the latest slot.

The default beam operation for receiving the PDSCH may be limited to the case in which a cross-carrier is not configured for the PDSCH.

Figure 12:
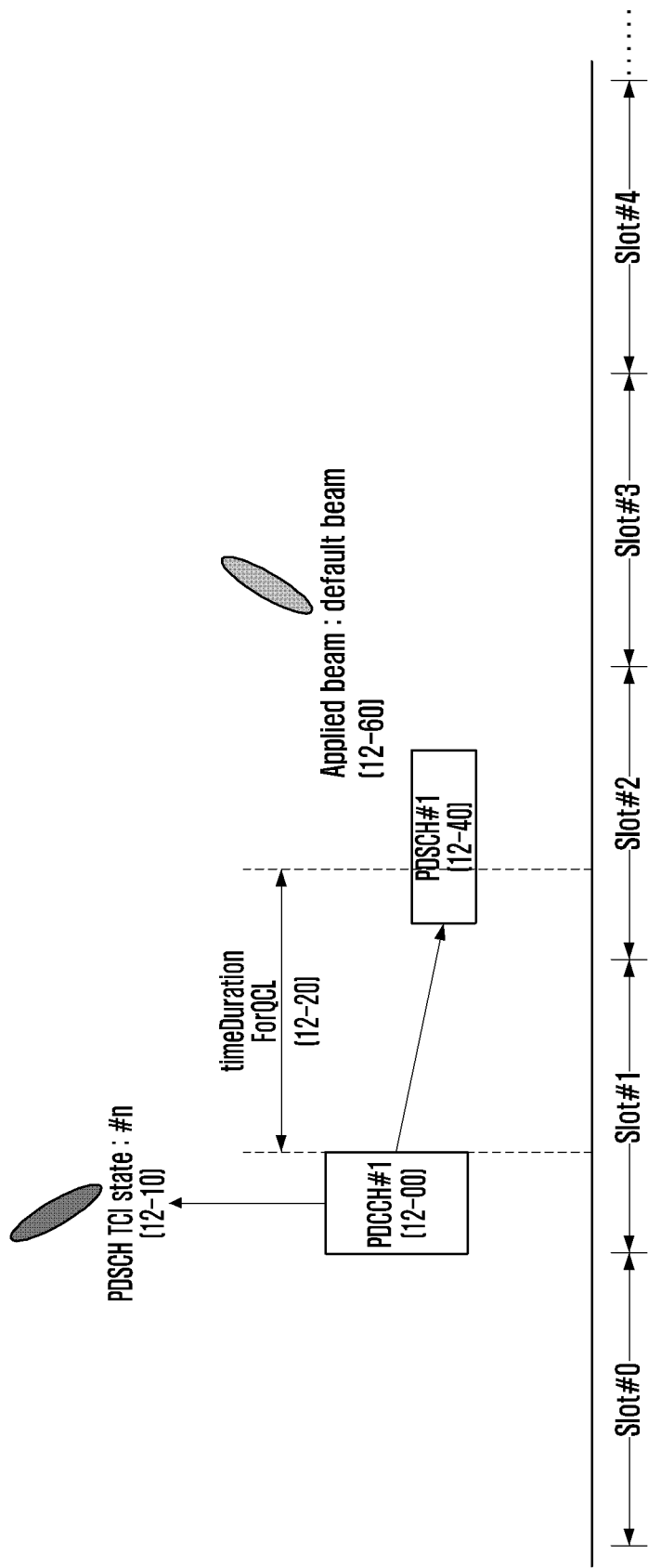
FIG. 12 is a diagram illustrating an example of a PDSCH default beam operation according to an embodiment of the disclosure.

FIG. 12 is a diagram illustrating an example of a PDSCH default beam operation according to an embodiment of the disclosure.

Referring to FIG. 12, illustrates an example of the PDSCH default beam operation. In the case where the TCI field for reception of a PDSCH, in the DCI 12-00 transmitted through the PDCCH, indicates TCI state #n (12-10), if the interval between the symbol in which the transmission of the PDCCH ends and a start symbol of the PDSCH 12-40 scheduled by the PDCCH is less than "timeDurationforQCL" 12-20, and if one or more TCI states in the TCI state list configured through RRC for the PDSCH include "QCL-TypeD," a default beam 12-60 may be applied to the PDSCH.

Meanwhile, if the parameter "tci-PresentinDCI" is not configured in the CORESET, or if the PDSCH is scheduled as DCI format 1_0, since there is no TCI field in the DCI, the UE is unable to receive an indication of a beam for reception of the PDSCH using the DCI. In this case, if the interval between the symbol in which the transmission of the PDCCH ends and the start symbol of the PDSCH scheduled by the PDCCH is greater than or equal to the value "timeDurationForQCL," the UE may assume that the beam for reception of the PDSCH is the same as the beam configured/activated in the PDCCH transmission CORESET, and the base station may configure a PDSCH transmission beam according to the assumption of the UE. The default beam operation for reception of the PDSCH may be limited to the case in which a cross-carrier is not configured for the PDSCH.

Next, configuration of cross-carrier scheduling for the PDSCH will be described. For cross-carrier scheduling, a configuration parameter for each serving cell configured through RRC, that is, "crossCarrierSchedulingConfig" having the following structure may be configured in "ServingCellConfig IE" configured for each serving cell/component carrier (CC).

```
CrossCarrierSchedulingConfig ::= SEQUENCE {
    schedulingCellInfo CHOICE {
        own SEQUENCE { -- Cross carrier scheduling: scheduling cell
            cif-Presence BOOLEAN
        },
        other SEQUENCE { -- Cross carrier scheduling: scheduled cell
            schedulingCellId ServCellIndex,
            cif-InSchedulingCell INTEGER (1..7)
        }
    },
    ...
}
```

In the case of performing cross-carrier scheduling from a specific serving cell to another serving cell, the specific serving cell may be referred to as a "scheduling cell" for convenience, and the value "cif-Presence" in the own value of the parameter "crossCarrierSchedulingConfig" may be configured to be true. In this case, the carrier indicator field (CIF), which has been described in Table 4, may exist in DCI format 0_1 or 1_1 of the scheduling cell. If the CIF indicates a value of 0, the PDSCH scheduled as the DCI format is transmitted through the scheduling cell. On the other hand, if the CIF indicates a non-zero value, the PDSCH scheduled as the DCI format is transmitted through a serving cell other than the scheduling cell. The serving cell corresponding to the value of the CIF may be referred to as a "scheduled cell" for convenience, and mapping between a specific scheduled cell and the CIF value may be performed through the value "cif-InSchedulingCell" in "other" of the parameter "crossCarrierSchedulingConfig." That is, if the value "cif-InSchedulingCell" is configured in "ServingCellConfig" of a specific scheduled cell, transmission of the PDSCH through the scheduled cell may be indicated to the UE by configuring the CIF value in the DCI of the scheduling cell as the value "cif-InSchedulingCell." There may be only one scheduling cell for a specific scheduled cell, and the indication of the scheduling cell for the specific scheduled cell may be performed by specifying the value "schedulingCellId" in "other" of the parameter "crossCarrierSchedulingConfig" in "ServingCellConfig" for the scheduled cell as an ID of the scheduling cell.

In addition, for configuration of cross-carrier scheduling, a search space set having the same ID may be required to be configured between the active BWP of the scheduling cell and the active BWP of the scheduled cell.

If the cross-carrier scheduling is configured in a specific serving cell as described above, it is possible to recognize whether or not the scheduling cell and the scheduled cell are of the same serving cell through the CIF value in the DCI field of the scheduling cell. Meanwhile, if the scheduled cell is different from the scheduling cell, the CORESET may not be configured in the scheduled cell. In this case, a PDSCH default beam may be unclear in the situation (i) in which the interval between the last symbol of the PDCCH and the start symbol of the scheduled PDSCH in the scheduling cell is less than "timeDurationforQCL" 12-20 or in the situation (ii) in which "tci-PresentinDCI" is not configured in the DCI for scheduling the PDSCH. If the assumption for the PDSCH default beam differs between the base station and the UE when the cross-carrier scheduling is configured, there may be a problem in which the UE is unable to normally receive the PDSCH. Accordingly, the disclosure provides a method of configuring a PDSCH default beam in the case in which cross-carrier scheduling is configured.

First Embodiment: PDSCH Default Beam is not Allowed if Cross-Carrier Scheduling is Configured In the case where cross-carrier scheduling is configured, the UE may not expect the situation in which a PDSCH default beam is configured, that is, the situation (i) in which the interval (offset) between the last symbol of a PDCCH and the start symbol of a scheduled PDSCH in the scheduling cell is less than "timeDurationforQCL" 12-20 or the situation (ii) in which "tci-PresentinDCI" is not configured in the DCI for scheduling the PDSCH. In addition, the base station may schedule the PDSCH so as to avoid the above situations according to the operation of the UE.

The operation of the UE and the base station may be applied to all CIF values in the DCI format for scheduling the PDSCH. That is, the operation of the UE and the base station may be applied both to the case in which the scheduling cell and the scheduled cell are the same and to the case in which the scheduling cell and the scheduled cell are different. This may be due to the fact that it is difficult to differently apply the PDSCH default beam depending on the CIF value because it is recognized whether the CIF value in the DCI format is 0 (the scheduling cell and the scheduled cell are the same) or not (the scheduling cell and the scheduled cell are different) only after decoding the PDCCH.

Figure 13:
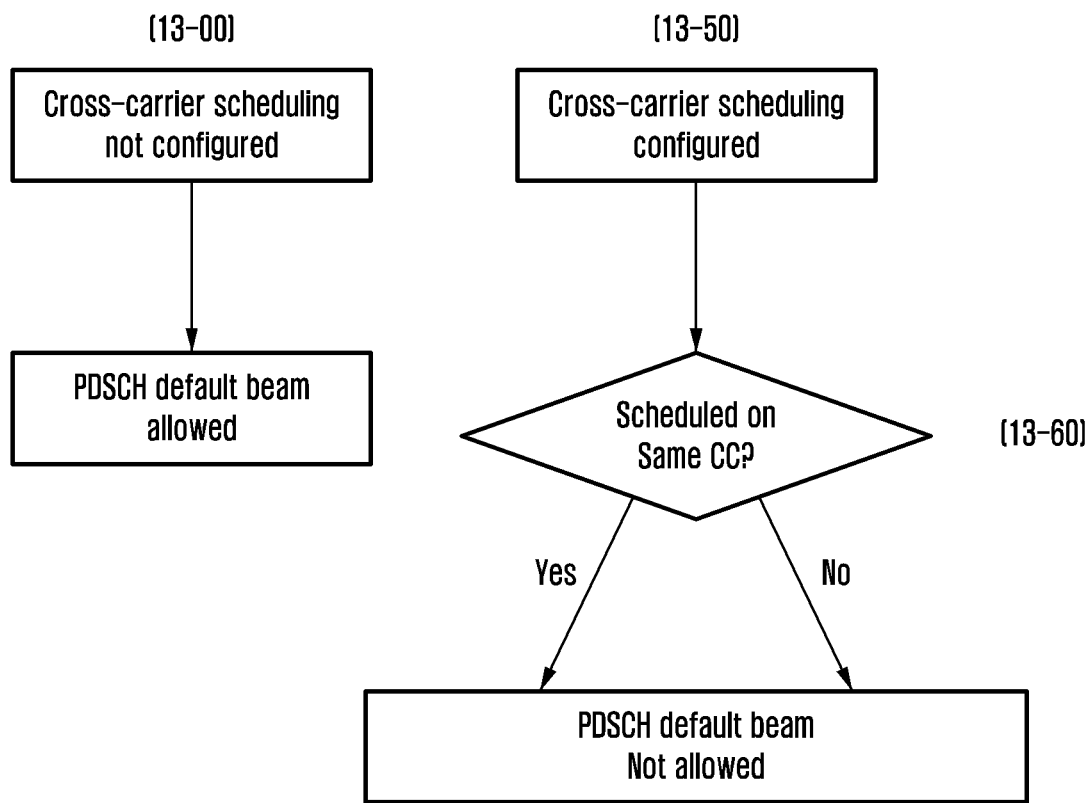
FIG. 13 is a diagram illustrating an operation of a base station and a user equipment according to an embodiment of the disclosure.

FIG. 13 illustrates operation of a base station and a UE according to the first embodiment of the disclosure.

Referring to FIG. 13, in the case where the cross-carrier scheduling is not configured as denoted by reference numeral 13-00, the PDSCH default beam operation is allowed, but if the cross-carrier scheduling is configured as denoted by reference numeral 13-50, the PDSCH default beam is not allowed, regardless of the condition denoted by reference numeral 13-60, that is, the CIF value.

The operation of the UE and the base station may be limited to specific conditions. For example, the case in which the situation (ii) is not allowed may be limited to the PDSCH scheduled as specific DCI formats, for example, DCI format 1_1 and DCI format 1_2. In the case of the PDSCH scheduled as DCI format 1_0, since the CIF and the TCI field are not included in the DCI format, the beam configured in the CORESET of the PDCCH that scheduled the PDSCH may be used as a default beam of the PDSCH.

Second Embodiment: PDSCH Default Beam is Allowed for CIF Value≠0 if Cross-Carrier Scheduling is Configured In the case where cross-carrier scheduling is configured, a PDSCH default beam may be configured for the case in which the CIF value≠0 in the scheduling DCI, that is, the case in which the scheduling cell and the scheduled cell are different. In this case, since a CORESET may not be configured in the scheduled cell, the UE may expect the PDSCH default beam for each of the following situations as follows.

Situation (i) in which the interval (offset) between the last symbol of the PDCCH and the start symbol of the scheduled PDSCH in the scheduling cell is less than "timeDurationforQCL" (12-20).

→ Assuming that the TCI state, having the lowest TCI state ID among the PDSCH TCI states activated by a MAC-CE, is a default beam of the PDSCH. That is, the TCI state, having the lowest TCI state ID among the activated TCI states applicable to the PDSCH in the active BWP of the scheduled cell, is a default beam of the PDSCH. The meaning that the TCI state is a default beam may mean that the UE obtains QCL assumption for the PDSCH scheduled by the DCI from the TCI state, according to described above.

Situation (ii) in which "tci-PresentinDCI" is not configured in the DCI for scheduling the PDSCH.

→ Assuming that the TCI state, having the lowest TCI state ID among the PDSCH TCI states activated by a MAC-CE, is a default beam of the PDSCH. That is, the TCI state, having the lowest TCI state ID among the activated TCI states applicable to the PDSCH in the active BWP of the scheduled cell, is a default beam of the PDSCH. The meaning that the TCI state is a default beam may mean that the UE obtains QCL assumption for the PDSCH scheduled by the DCI from the TCI state, according to described above.

In addition, the base station may transmit a PDSCH according to the assumption of the UE for the PDSCH default beam in the case in which the UE uses the PDSCH default beam.

The operation of the UE and the base station may be applied so as to be limited to a specific CIF value in the DCI format for scheduling the PDSCH. For example, the operation of the UE and the base station may be applied only if the CIF value is not 0 (if the scheduling cell and the scheduled cell are different), and may not be applied if the CIF value is 0 (if the scheduling cell and the scheduled cell are the same). This is due to the fact that the above-described assumption of the UE for the PDSCH default beam may be appropriate to the case where there is no CORESET in the scheduled cell. If the CIF value is 0, according to the first embodiment, the UE may not expect the situation in which the PDSCH default beam is configured, and the base station may schedule the PDSCH so as to avoid the situation in which the default beam is configured.

Figure 14:
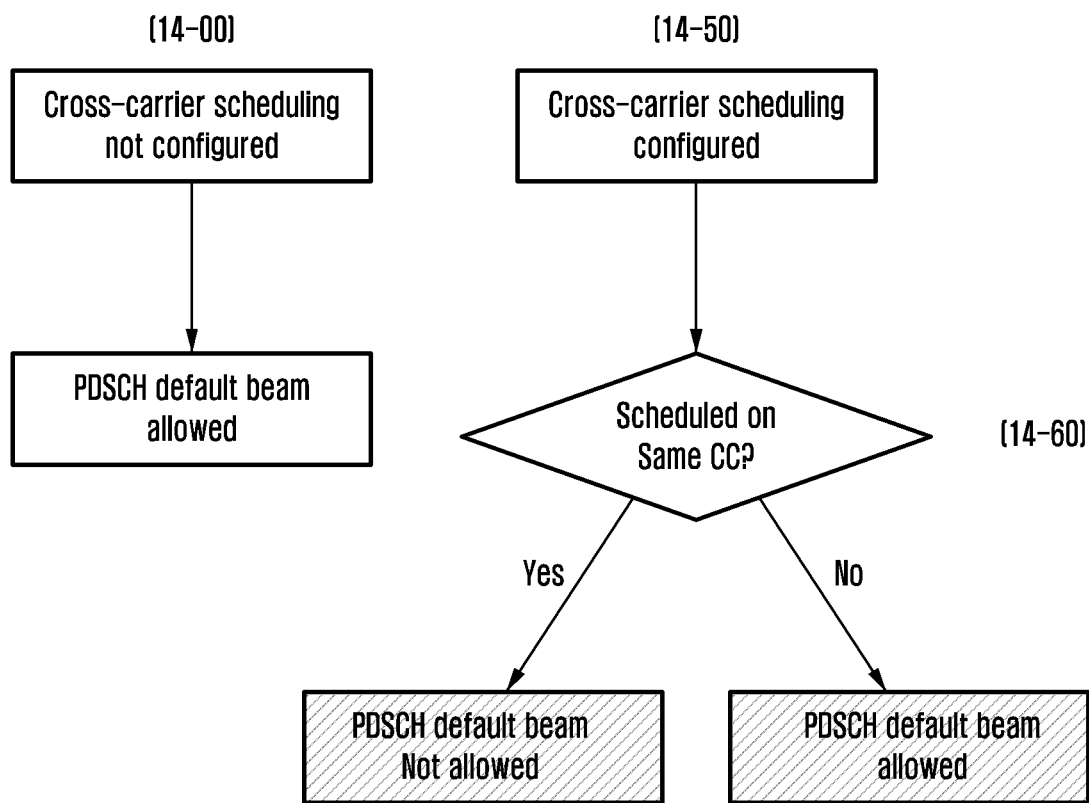
FIG. 14 is a diagram illustrating an operation of a base station and a user equipment according to an embodiment of the disclosure.

FIG. 14 is a diagram illustrating the operation of a base station and a user equipment according to an embodiment of the disclosure.

Referring to FIG. 14, it illustrates operation of a base station and a UE according to the second embodiment. In the case where the cross-carrier scheduling is not configured as denoted by reference numeral 14-00, the PDSCH default beam operation is allowed, but if the cross-carrier scheduling is configured as denoted by reference numeral 14-50, depending on the condition denoted by reference numeral 14-60 (i.e., the CIF value), the PDSCH default beam is allowed if the CIF value is not 0 (if the scheduling cell and the scheduled cell are different), and the PDSCH default beam is not allowed if the CIF value is 0 (if the scheduling cell and the scheduled cell are the same).

Third Embodiment: Different PDSCH Default Beams are Allowed Depending on CIF Value if Cross-Carrier Scheduling is Configured In the case in which cross-carrier scheduling is configured, if the PDSCH default beam is not allowed according to the first embodiment, the symbol interval (offset) between the PDCCH and the scheduled PDSCH must always be greater than or equal to a specific value, which causes long latency in the PDSCH transmission. In addition, dynamic beam change for the PDSCH is not required in some cases such as the case in which the UE is located indoors and does not move, but if the PDSCH default beam is not allowed at that time, unnecessary configuration and control information transmission overhead for indicating the beam for every PDSCH may occur. In addition, according to the second embodiment, in the case where the cross-carrier scheduling is configured, if the PDSCH default beam is allowed only when the CIF value≠0, this may bring about unnecessary restriction in which the PDSCH default beam is not allowed when the scheduling cell is the same as the scheduled cell, that is, the CIF value=0. Accordingly, the PDSCH default beam is required to be allowed for all CIF values, and it is necessary to configure different PDSCH default beams for the case in which the CIF value=0 and the case in which the CIF value≠0.

First, if the CIF value≠0, the PDSCH default beam may be allowed according to the second embodiment.

On the other hand, if the CIF value=0, that is, if the scheduling cell is the same as the scheduled cell, a CORESET may be configured in the scheduled cell. Accordingly, the UE may expect the PDSCH default beam as one of the following in each of the following situations.

Situation (i) in which the interval (offset) between the last symbol of the PDCCH and the start symbol of the scheduled PDSCH in the scheduling cell is less than "timeDurationforQCL" (12-20).

→ Method i-1. Assuming that the TCI state configured in the CORESET corresponding to the lowest ID (e.g., CORESET #0) among the CORESETs corresponding to the monitored search space of the latest slot based on the PDSCH reception slot is a default beam of the PDSCH.

With the PDSCH reception slot as a reference point, assuming that the TCI state configured in the CORESET corresponding to the lowest ID among the CORESETs corresponding to the monitored search space in the latest slot in which the CORESETs within the active BWP of the scheduling cell are monitored by the UE is a default beam of the PDSCH. The TCI state may correspond to or be associated with one of QCL parameters used for PDCCH QCL indication of the CORESET, according to described above.

The above method ensures the consistency in the operation of the UE both in the case where the cross-carrier scheduling is configured and in the case where the cross-carrier scheduling is not configured. In the above situation (i), if different PDSCH default beams are configured depending on whether or not the cross-carrier scheduling is configured, the UE must perform different buffering operations depending on whether or not the cross-carrier scheduling is configured, which may greatly complicate implementation of the UE.

→ Method i-2. Assuming that the TCI state having the lowest TCI state ID, among the PDSCH TCI states activated by a MAC-CE, is a default beam of the PDSCH.

The above method ensures the consistency in the operation of the UE for all CIF values in the case where the cross-carrier scheduling is configured. In the above situation (i), if different PDSCH default beams are configured depending on whether or not the CIF value is 0, the UE must perform different buffering operations for the respective serving cells, which may complicate implementation of the UE.

Situation (ii) in which "tci-PresentinDCI" is not configured in the DCI for scheduling the PDSCH.

→ Method ii-1. Assuming that the TCI state, activated in the CORESET in which the PDCCH for scheduling the PDSCH is transmitted, is a default beam of the PDSCH.

The above method ensures the consistency in the operation of the UE both in the case where the cross-carrier scheduling is configured and in the case where the cross-carrier scheduling is not configured. In addition, since the above method relates to the PDSCH default beam applicable to DCI format 1_0, the method ensures the consistency in the operation of the UE for different DCI formats such as DCI format 1_0, DCI format 1_1, and DCI format 1_2.

→ Method ii-2. Assuming that the TCI state having the lowest TCI state ID, among the PDSCH TCI states activated by a MAC-CE, is a default beam of the PDSCH.

The above method ensures the consistency in the operation of the UE for all CIF values in the case where the cross-carrier scheduling is configured.

In addition, the base station may transmit a PDSCH according to the assumption of the UE for the PDSCH default beam in the situation in which the UE uses the PDSCH default beam.

Figure 15:
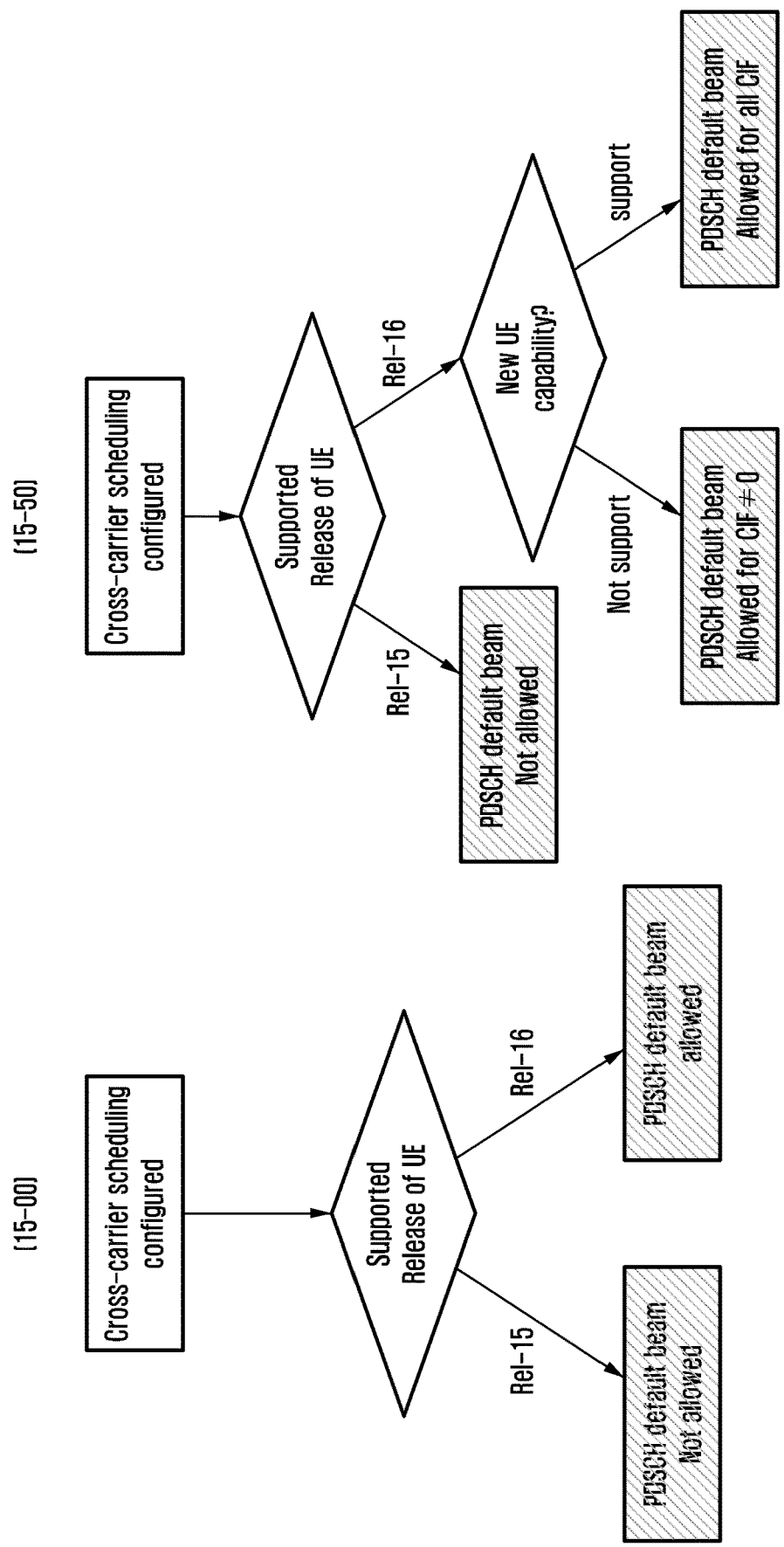
FIG. 15 is a diagram illustrating an operation of a base station and a user equipment depending on conditions according to an embodiment of the disclosure.

FIG. 15 is a diagram illustrating the operation of a base station and a user equipment depending on conditions according to an embodiment of the disclosure.

Conditions for the operation of the third embodiment described above may be configured. Referring to FIG. 15, it is an example of conditions for the operation of the third embodiment. For example, in order to ensure existing backward compatibility of the UE, the UE operating under Rel-15 may operate according to the first embodiment, whereas the UE operating under Rel-16 may operate according to the third embodiment (15-00). Alternatively, the UE operating according to the third embodiment and the UE operating according to the first and second embodiments may be distinguished by the UE capability. For example, the UE operating according to the first embodiment and the UE operating according to the second embodiment may be distinguished by Release of the UE so that, for example, the Rel-15 UE may operate according to the first embodiment and the Rel-16 UE may operate according to the second embodiment. The UE operating according to the second embodiment and the UE operating according to third embodiment may be distinguished by the capability that is further reported by the UE. For example, the UE that supports specific capability, among Rel-16 UEs, may operate according to the third embodiment, whereas the UE that does not support the capability may operate according to the second embodiment (15-50).

Figure 16:
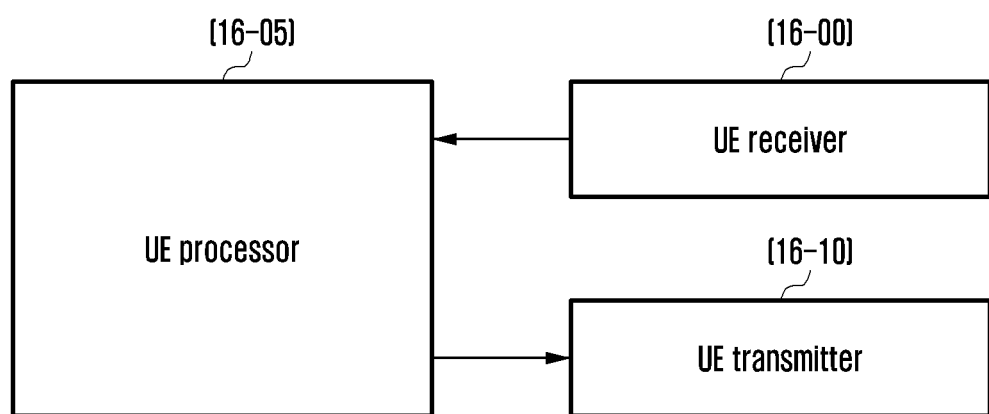
FIG. 16 illustrates the structure of a user equipment in a wireless communication system according to an embodiment of the disclosure.

FIG. 16 is a block diagram illustrating the structure of a UE in a wireless communication system according to an embodiment of the disclosure.

Referring to FIG. 16, a UE may include a UE receiver 16-00, a UE transmitter 16-10, and a UE processor (controller) 16-05.

The UE receiver 16-00 and the UE transmitter 16-10 may be collectively referred to as a "transceiver." The UE receiver 16-00, the UE transmitter 16-10, and the UE processor 16-05 of the UE may operate according to the aforementioned communication method of the UE. However, the elements of the UE are not limited to the above-described example. For example, the UE may include more elements (e.g., a memory and the like) or fewer elements than the above-described elements. In addition, the UE receiver 16-00, the UE transmitter 16-10, and the UE processor 16-05 may be implemented in the form of a single chip.

The UE receiver 16-00 and the UE transmitter 16-10 (or the transceiver) may transmit and receive signals to and from a base station. The signal may include control information and data. To this end, the transceiver may include an RF transmitter that up-converts and amplifies the frequency of a signal to be transmitted, and an RF receiver that low-noise-amplifies a received signal and down-converts the frequency thereof. However, this is only an embodiment of the transceiver, and elements of the transceiver are not limited to the RF transmitter and the RF receiver.

In addition, the transceiver may receive a signal through a radio channel, may output the same to the UE processor 16-05, and may transmit a signal output from the UE processor 16-05 through a radio channel.

A memory (not shown) may store programs and data required for the operation of the UE. In addition, the memory may store control information or data included in the signal obtained by the UE. The memory may include a storage medium such as ROM, RAM, a hard disk, CD-ROM, and DVD, or a combination thereof.

The UE processor 16-05 may control a series of processes such that the UE operates according to the above-described embodiment. The UE processor 16-05 may be implemented as a controller or one or more processors.

Figure 17:
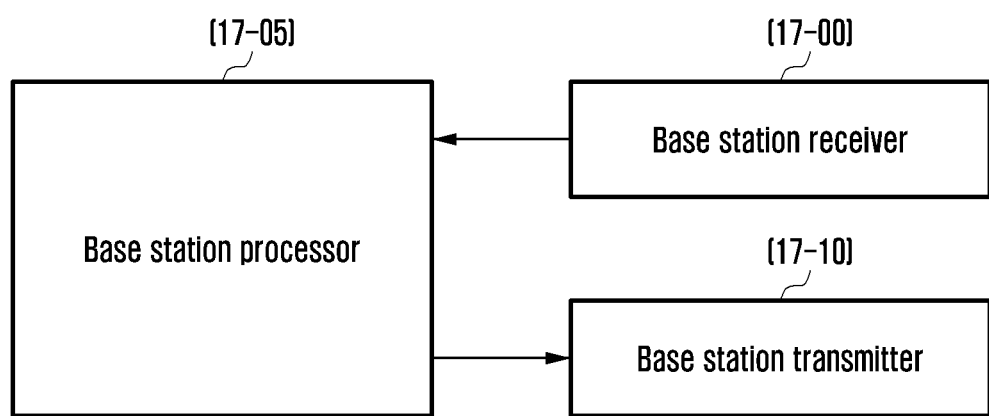
FIG. 17 illustrates the structure of a base station in a wireless communication system according to an embodiment of the disclosure.

FIG. 17 is a block diagram illustrating the structure of a base station in a wireless communication system according to an embodiment of the disclosure.

Referring to FIG. 17, a base station may include a base station receiver 17-00, a base station transmitter 17-10, and a base station processor (controller) 17-05.

The base station receiver 17-00 and the base station transmitter 17-10 may be collectively referred to as a "transceiver." The base station receiver 17-00, the base station transmitter 17-10, and the base station processor 17-05 of the base station may operate according to the aforementioned communication method of the base station. However, the elements of the base station are not limited to the above-described example. For example, the base station may include more elements (e.g., a memory and the like) or fewer elements than the above-described elements. In addition, the base station receiver 17-00, the base station transmitter 17-10, and the base station processor 17-05 may be implemented in the form of a single chip.

The base station receiver 17-00 and the base station transmitter 17-10 (or the transceiver) may transmit and receive signals to and from a UE. The signal may include control information and data. To this end, the transceiver may include an RF transmitter that up-converts and amplifies the frequency of a signal to be transmitted, and an RF receiver that low-noise-amplifies a received signal and down-converts the frequency thereof. However, this is only an embodiment of the transceiver, and elements of the transceiver are not limited to the RF transmitter and the RF receiver.

In addition, the transceiver may receive a signal through a radio channel, may output the same to the base station processor 17-05, and may transmit a signal output from the base station processor 17-05 through a radio channel.

A memory (not shown) may store programs and data required for the operation of the base station. In addition, the memory may store control information or data included in the signal obtained by the base station. The memory may include a storage medium such as ROM, RAM, a hard disk, CD-ROM, and DVD, or a combination thereof.

The base station processor 17-05 may control a series of processes such that the base station operates according to the above-described embodiment. The base station processor 17-05 may be implemented as a controller or one or more processors.

In the drawings in which methods of the disclosure are described, the order of the description does not always correspond to the order in which operations of each method are performed, and the order relationship between the operations may be changed or the operations may be performed in parallel.

Alternatively, in the drawings in which methods of the disclosure are described, some elements may be omitted and only some elements may be included therein without departing from the essential spirit and scope of the disclosure.

Further, in methods of the disclosure, some or all of the contents of each embodiment may be combined without departing from the essential spirit and scope of the disclosure.

In addition, although not disclosed in the disclosure, a method can also use a separate table or information including at least one item included in the table proposed in the disclosure.

While the disclosure has been shown described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a terminal in a wireless communication system, the method comprising:
   receiving, from a base station, cross carrier scheduling configuration including information indicating that a carrier indicator field (CIF) is included in downlink control information (DCI);
   receiving, from a first cell of the base station, the DCI for scheduling a physical downlink shared channel (PDSCH), the DCI including the CIF;
   in case that the CIF indicates that a resource assignment of the PDSCH is for the first cell, identifying whether a first offset value between a reception of the DCI and the PDSCH is less than a threshold; and
   in case that the first offset value is less than the threshold and the terminal supports default beam selection for the PDSCH, receiving, from the first cell of the base station, data on the PDSCH based on quasi co-located (QCL) parameters for a control resource set (CORESET) associated with a search space with a lowest CORESET identifier (ID) within an active bandwidth part (BWP) of the first cell in a latest slot monitored by the terminal.

2. The method of claim 1, further comprising:
   in case that the CIF indicates that the resource assignment of the PDSCH is for a second cell of the base station, identifying whether a second offset value between the reception of the DCI and the PDSCH is less than the threshold; and
   in case that the second offset value is less than the threshold and the terminal supports the default beam selection for the PDSCH, receiving, from the second cell of the base station, data on the PDSCH based on information on a transmission configuration indication (TCI) state with a lowest TCI state ID among activated TCI states in an active BWP of the second cell.

3. The method of claim 1, further comprising:
   in case that the CIF indicates that the resource assignment of the PDSCH is for a second cell of the base station, the terminal supports the default beam selection for the PDSCH and the DCI does not include a transmission configuration indication (TCI) field, receiving, from the second cell of the base station, data on the PDSCH based on information on a TCI state with a lowest TCI state ID among activated TCI states in an active BWP of the second cell.

4. The method of claim 1, further comprising:
   transmitting, to the base station, capability information of the terminal, the capability information including information indicating that the terminal supports the default beam selection for the PDSCH.

5. The method of claim 4, wherein the capability information further includes information on the threshold.

6. A method performed by a base station in a wireless communication system, the method comprising:
   transmitting, to a terminal, cross carrier scheduling configuration including information indicating that a carrier indicator field (CIF) is included in downlink control information (DCI);
   transmitting, from a first cell of the base station to the terminal, the DCI for scheduling a physical downlink shared channel (PDSCH), the DCI including the CIF; and
   in case that the CIF indicates that a resource assignment of the PDSCH is for the first cell, transmitting, from the first cell of the base station to the terminal, first data on the PDSCH, wherein in case that a first offset value between a reception of the DCI and the PDSCH is less than a threshold and the terminal supports default beam selection for the PDSCH, the first data is associated with quasi co-located (QCL) parameters for a control resource set (CORESET) associated with a search space with a lowest CORESET identifier (ID) within an active bandwidth part (BWP) of the first cell in a latest slot monitored by the terminal.

7. The method of claim 6, further comprising:
   in case that the CIF indicates that the resource assignment of the PDSCH is for a second cell of the base station, transmitting, from the second cell of the base station to the terminal, second data on the PDSCH, wherein in case that a second offset value between the reception of the DCI and the PDSCH is less than the threshold and the terminal supports the default beam selection for the PDSCH, the second data is associated with information on a transmission configuration indication (TCI) state with a lowest TCI state ID among activated TCI states in an active BWP of the second cell.

8. The method of claim 6,
   wherein in case that the terminal supports the default beam selection for the PDSCH and the DCI does not include a transmission configuration indication (TCI) field, second data is associated with information on a TCI state with a lowest TCI state ID among activated TCI states in an active BWP of a second cell.

9. The method of claim 6, further comprising:
   receiving, from the terminal, capability information of the terminal, the capability information including information indicating that the terminal supports the default beam selection for the PDSCH.

10. The method of claim 9, wherein the capability information further includes information on the threshold.

11. A terminal in a wireless communication system, the terminal comprising:
    a transceiver; and
    a controller coupled with the transceiver and configured to:

receive, from a base station, cross carrier scheduling configuration including information indicating that a carrier indicator field (CIF) is included in downlink control information (DCI), receive, from a first cell of the base station, the DCI for scheduling a physical downlink shared channel (PDSCH), the DCI including the CIF, in case that the CIF indicates that a resource assignment of the PDSCH is for the first cell, identify whether a first offset value between a reception of the DCI and the PDSCH is less than a threshold, and in case that the first offset value is less than the threshold and the terminal supports default beam selection for the PDSCH, receive, from the first cell of the base station, data on the PDSCH based on quasi co-located (QCL) parameters for a control resource set (CORESET) associated with a search space with a lowest CORESET identifier (ID) within an active bandwidth part (BWP) of the first cell in a latest slot monitored by the terminal.

12. The terminal of claim 11, wherein the controller is further configured to:

in case that the CIF indicates that the resource assignment of the PDSCH is for a second cell of the base station, identify whether a second offset value between the reception of the DCI and the PDSCH is less than the threshold, and in case that the second offset value is less than the threshold and the terminal supports the default beam selection for the PDSCH, receive, from the second cell of the base station, data on the PDSCH based on information on a transmission configuration indication (TCI) state with a lowest TCI state ID among activated TCI states in an active BWP of the second cell.

13. The terminal of claim 11, wherein the controller is further configured to:

in case that the CIF indicates that the resource assignment of the PDSCH is for a second cell of the base station, the terminal supports the default beam selection for the PDSCH and the DCI does not include a transmission configuration indication (TCI) field, receive, from the second cell of the base station, data on the PDSCH based on information on a TCI state with a lowest TCI state ID among activated TCI states in an active BWP of the second cell.

14. The terminal of claim 11, wherein the controller is further configured to:

transmit, to the base station, capability information of the terminal, the capability information including information indicating that the terminal supports the default beam selection for the PDSCH.

15. The terminal of claim 14, wherein the capability information further includes information on the threshold.

16. A base station in a wireless communication system, the base station comprising:

a transceiver; and a controller coupled with the transceiver and configured to:

transmit, to a terminal, cross carrier scheduling configuration including information indicating that a carrier indicator field (CIF) is included in downlink control information (DCI), transmit, from a first cell of the base station to the terminal, the DCI for scheduling a physical downlink shared channel (PDSCH), the DCI including the CIF, and in case that the CIF indicates that a resource assignment of the PDSCH is for the first cell, transmit, from the first cell of the base station to the terminal, first data on the PDSCH, wherein in case that a first offset value between a reception of the DCI and the PDSCH is less than a threshold and the terminal supports default beam selection for the PDSCH, the first data is associated with quasi co-located (QCL) parameters for a control resource set (CORESET) associated with a search space with a lowest CORESET identifier (ID) within an active bandwidth part (BWP) of the first cell in a latest slot monitored by the terminal.

17. The base station of claim 16, wherein the controller is further configured to:

in case that the CIF indicates that the resource assignment of the PDSCH is for a second cell of the base station, transmit, from the second cell of the base station to the terminal, second data on the PDSCH, and wherein in case that a second offset value between the reception of the DCI and the PDSCH is less than the threshold and the terminal supports the default beam selection for the PDSCH, the second data is associated with information on a transmission configuration indication (TCI) state with a lowest TCI state ID among activated TCI states in an active BWP of the second cell.

18. The base station of claim 16, wherein in case that the terminal supports the default beam selection for the PDSCH and the DCI does not include a transmission configuration indication (TCI) field, second data is associated with information on a TCI state with a lowest TCI state ID among activated TCI states in an active BWP of a second cell.

19. The base station of claim 16, wherein the controller is further configured to:

receive, from the terminal, capability information of the terminal, the capability information including information indicating that the terminal supports the default beam selection for the PDSCH.

20. The base station of claim 19, wherein the capability information further includes information on the threshold.

* * * * *